(12) United States Patent
Tsushima et al.

(10) Patent No.: US 12,339,669 B2
(45) Date of Patent: Jun. 24, 2025

(54) TRANSPORT SYSTEM, CONTROL APPARATUS, TRANSPORT METHOD, AND PROGRAM

(71) Applicant: NEC Corporation, Tokyo (JP)

(72) Inventors: Ryusuke Tsushima, Tokyo (JP); Junichiro Tsuchiya, Tokyo (JP); Hiroshi Yoshida, Tokyo (JP); Shinya Yasuda, Tokyo (JP); Taichi Kumagai, Tokyo (JP)

(73) Assignee: NEC Corporation, Tokyo (JP)

( * ) Notice: Subject to any disclaimer, the term of this patent is extended or adjusted under 35 U.S.C. 154(b) by 626 days.

(21) Appl. No.: 17/633,633

(22) PCT Filed: Aug. 20, 2020

(86) PCT No.: PCT/JP2020/031493
§ 371 (c)(1),
(2) Date: Feb. 8, 2022

(87) PCT Pub. No.: WO2021/039595
PCT Pub. Date: Mar. 4, 2021

(65) Prior Publication Data
US 2022/0291696 A1    Sep. 15, 2022

(30) Foreign Application Priority Data
Aug. 26, 2019    (JP) .................................. 2019-153965

(51) Int. Cl.
*G06F 7/00*        (2006.01)
*B65G 1/137*       (2006.01)
*G05D 1/00*        (2006.01)

(52) U.S. Cl.
CPC ......... *G05D 1/0291* (2013.01); *B65G 1/1371* (2013.01)

(58) Field of Classification Search
CPC ............... G05D 1/0291; G05D 1/0297; B65G 1/1371; B65G 1/0492
(Continued)

(56) References Cited

U.S. PATENT DOCUMENTS 10,245,993 B1 *    4/2019    Brady .................. B60P 7/13

FOREIGN PATENT DOCUMENTS

CA        3068963 A1 *    3/2019    ........... G01C 21/206
JP        H10-029556 A    2/1998
(Continued)

OTHER PUBLICATIONS

JP Office Action for JP Application No. 2021-542818, mailed on Sep. 26, 2023 with English Translation.
(Continued)

*Primary Examiner* — Yolanda R Cumbess
(74) *Attorney, Agent, or Firm* — Michael Dryja

(57) ABSTRACT

In order to provide a transport system that facilitates input of information related to movements of articles, the transport system includes a transport robot, a control apparatus, and a terminal. The transport robot transports an article. The control apparatus controls the transport robot. The terminal inputs information related to the transport of the article. The control apparatus identifies a transport destination of the article, based on the information related to the transport of the article obtained from the terminal. The control apparatus performs control to transport the article to the identified transport destination. The terminal may transmit first position information and second position information to the control apparatus, and the control apparatus may control the transport robot such that the article existing in a place corresponding to the first position information is transported to a place corresponding to the second position information.

18 Claims, 26 Drawing Sheets

(58) Field of Classification Search
USPC .......................................... 700/213–215, 228
See application file for complete search history.

(56) References Cited

FOREIGN PATENT DOCUMENTS

| | | |
|---|---|---|
| JP | 2007-210800 A | 8/2007 |
| JP | 2016-133945 A | 7/2016 |
| JP | 2019-109845 A | 7/2019 |
| WO | 2017/090108 A1 | 6/2017 |
| WO | 2019/155552 A1 | 8/2019 |

OTHER PUBLICATIONS

International Search Report for PCT Application No. PCT/JP2020/031493, mailed on Nov. 10, 2020.
English translation of Written opinion for PCT Application No. PCT/JP2020/031493, mailed on Nov. 10, 2020.

* cited by examiner

ROBOT POSITION INFORMATION

| TRANSPORT ROBOT | ABSOLUTE COORDINATES |
|---|---|
| TRANSPORT ROBOT 10-1 | (x11,y11,z11) |
| TRANSPORT ROBOT 10-2 | (x21,y21,z21) |
| ... | ... |

Fig.8

ARTICLE PLACEMENT AREA CONFIGURATION INFORMATION

| ARTICLE PLACEMENT AREA | SMALL AREA | COORDINATES OF SMALL AREA | PLACEMENT STATE |
|---|---|---|---|
| AREA A | A1 | (x11,y11),(x12,y12),(x13,y13),(x14,y14) | ARTICLE PRESENT |
| | A2 | (x21,y21),(x22,y22),(x23,y23),(x24,y24) | ARTICLE ABSENT |
| | A3 | (x31,y31),(x32,y32),(x33,y33),(x34,y34) | ARTICLE ABSENT |
| | A4 | (x41,y41),(x42,y42),(x43,y43),(x44,y44) | ARTICLE PRESENT |
| AREA B | B1 | (x51,y51),(x52,y52),(x53,y53),(x54,y54) | ARTICLE ABSENT |
| ... | | ... | ... |

Fig.10

ARTICLE EXISTENCE/NON-EXISTENCE INFORMATION

| SMALL AREA | PRESENCE/ABSENCE OF ARTICLE |
|---|---|
| AREA A1 | ARTICLE PRESENT |

Fig. 11

ARTICLE EXISTENCE/NON-EXISTENCE INFORMATION

| SMALL AREA | PRESENCE/ABSENCE OF ARTICLE |
|---|---|
| AREA A1 | ARTICLE ABSENT |

Fig. 12

ENTER TRANSPORT SOURCE AND TRANSPORT DESTINATION OF ARTICLE.

TRANSPORT TARGET ARTICLE : [ARTICLE A]

TRANSPORT SOURCE : [AREA A1]

TRANSPORT DESTINATION : [ARTICLE PLACEMENT AREA C]

[COMPLETE]  [CANCEL]

Fig.15

ENTER TRANSPORT SOURCE AND TRANSPORT DESTINATION OF ARTICLE.

TRANSPORT TARGET ARTICLE : ARTICLE A

TRANSPORT SOURCE : AREA A1

TRANSPORT DESTINATION : AREAS C1, C2

COMPLETE   CANCEL

Fig.16

ENTER TRANSPORT SOURCE AND TRANSPORT DESTINATION OF ARTICLE.

TRANSPORT TARGET ARTICLE : | ARTICLE A |

TRANSPORT SOURCE : | AREA A1 |

TRANSPORT DESTINATION : | UPPER SIDE OF AREA C |

| COMPLETE |   | CANCEL |

Fig. 17

ENTER TRANSPORT SOURCE AND TRANSPORT DESTINATION OF ARTICLE.

TRANSPORT TARGET ARTICLE : ARTICLE A

TRANSPORT SOURCE : AREA A1

TRANSPORT DESTINATION : AREA C1

WHETHER TO PERMIT TRANSPORT TO OTHER AREAS : Yes

COMPLETE    CANCEL

Fig. 18

ENTER TRANSPORT SOURCE AND TRANSPORT DESTINATION OF ARTICLE.

TRANSPORT TARGET ARTICLE : [ ARTICLE.A ]

TRANSPORT SOURCE : [ AREA A1 ]

TRANSPORT DESTINATION : [ AREA C1 ]

MODE OF ARTICLE TRANSPORT : [ LOOP ]

[ COMPLETE ]   [ CANCEL ]

Fig.19

ENTER TRANSPORT SOURCE AND TRANSPORT DESTINATION OF ARTICLE.

TRANSPORT TARGET ARTICLE : ARTICLE A

TRANSPORT SOURCE : AREA A1

TRANSPORT DESTINATION : AREA C1

TRANSPORT ROBOT : TRANSPORT ROBOT A

COMPLETE    CANCEL

Fig.20

FIELD CONFIGURATION INFORMATION

| NODE | ABSOLUTE COORDINATES |
|---|---|
| N 1 | (x1,y1) |
| N 2 | (x2,y2) |
| ... | ... |

Fig.22

LINK INFORMATION

| LINK NAME | START NODE | END NODE | DISTANCE BETWEEN LINKS |
|---|---|---|---|
| LINK 1 | N 1 | N 2 | L 1 |
| LINK 2 | N 2 | N 3 | L 2 |
| ... | ... | ... | ... |

Fig.23

ROBOT MANAGEMENT INFORMATION

| TRANSPORT ROBOT | STATE | PAIR ROBOT | CURRENT POSITION | TRANSPORT ROUTE | TRANSPORT SOURCE | TRANSPORT DESTINATION |
|---|---|---|---|---|---|---|
| TRANSPORT ROBOT 10-1 | TRANSPORTING | TRANSPORT ROBOT 10-2 | (x61,y61,z61) | N1,N2,... | AREA A1 | AREA C1 |
| TRANSPORT ROBOT 10-2 | TRANSPORTING | TRANSPORT ROBOT 10-1 | (x71,y71,z71) | N1,N2,... | AREA A1 | AREA C1 |
| TRANSPORT ROBOT 10-3 | WAITING | ... | ... | ... | ... | ... |
| TRANSPORT ROBOT 10-4 | WAITING | ... | ... | ... | ... | ... |
| ... | ... | ... | ... | ... | ... | ... |

Fig.24

TRANSPORT SYSTEM, CONTROL APPARATUS, TRANSPORT METHOD, AND PROGRAM

This application is a National Stage Entry of PCT/JP2020/031493 filed on Aug. 20, 2020, which claims priority from Japanese Patent Application 2019-153965 filed on Aug. 26, 2019, the contents of all of which are incorporated herein by reference, in their entirety.

BACKGROUND

Technical Field

The present invention relates to a transport system, a control apparatus, a transport method, and a program.

Background Art

At production sites such as factories, it is needed to move articles such as parts and materials used. It is also necessary to move articles in distribution warehouses. Transport robots (Automated Guided Vehicles (AGVs)) are used to move these articles.

Here, regarding movements of articles in factories and the like, transport destinations of articles are predetermined, and types of articles (materials) to be handled are not so many. Thus, the transport robots are only required to transport a limited variety of articles through fixed routes.

Due to such circumstances, in factories and the like, for example, magnetic tapes or QR codes (registered trademark) are attached to a floor, and transport robots that move by relying on the magnetic tapes or the like are often used. Alternatively, in recent years, transport robots called Simultaneous Localization and Mapping (SLAM), which estimate their own positions and move to destinations, are also used.

PTL 1 discloses a shelf placement system in which transport robots lift and move shelves. PTL 2 discloses transport robots that control traveling according to route information received from a control apparatus.

CITATION LIST

Patent Literature

[PTL 1] WO 2017/090108
[PTL 2] JP 2016-133945 A

SUMMARY

Technical Problem

In a system disclosed in PTL 1, transport robots obtain coordinate data related to movements of shelves from a management terminal, and determines the movement routes according to the data. Transport robots disclosed in PTL 2 obtain information related to movement sources and movement destinations from users (operators), and determine movement routes according to the information.

As described above, in the techniques disclosed in PTLs 1 and 2, it is necessary to input coordinate information related to movement sources and movement destinations of transport robots to the transport robots or the like. However, in a site such as a factory where a large number of articles need to be moved, it is a heavy burden on the operator to input coordinate information necessary for movement for each of the large number of articles.

A main example object of the present invention is to provide a transport system, a control apparatus, a transport method, and a program that contribute to facilitating input of information related to movements of articles.

Solution to Problem

According to a first example aspect of the present invention, provided is a transport system including: a transport robot configured to transport an article; a control apparatus configured to control the transport robot; and a terminal configured to input information related to transport of the article, wherein the control apparatus is configured to: identify a transport destination of the article, based on the information related to the transport acquired from the terminal; and perform control of the transport robot to transport the article to the identified transport destination.

According to a second example aspect of the present invention, provided is a control apparatus connected to a transport robot configured to transport an article and a terminal configured to input information related to transport of the article, wherein the control apparatus is configured to: identify a transport destination of the article, based on the information related to the transport obtained from the terminal; and perform control of the transport robot to transport the article to the identified transport destination.

According to a third example aspect of the present invention, provided is a transport method performed in a transport system provided with a transport robot configured to transport an article, a control apparatus configured to control the transport robot, and a terminal configured to input information related to transport of the article, the transport method comprising: identifying a transport destination of the article, based on the information related to the transport obtained from the terminal; and performing control of the transport robot to transport the article to the identified transport destination.

According to a fourth example aspect of the present invention, provided is a program for causing a computer mounted on a control apparatus connected to a transport robot configured to transport an article and a terminal configured to input information related to transport of the article to perform: identifying a transport destination of the article, based on the information related to the transport obtained from the terminal; and performing control of the transport robot to transport the article to the identified transport destination.

Advantageous Effects of Invention

According to each example aspect of the present invention, a transport system, a control apparatus, a transport method, and a program that contribute to facilitating input of information related to movements of articles are provided. Note that, according to the present invention, instead of or together with the above effects, other effects may be exerted.

BRIEF DESCRIPTION OF THE DRAWINGS

FIG. 8 is a diagram illustrating an example of robot position information transmitted from the position information management apparatus;

FIG. 10 is a diagram illustrating an example of article placement area configuration information;

FIG. 11 is a diagram illustrating an example of article existence/non-existence information;

FIG. 12 is a diagram illustrating an example of article existence/non-existence information;

FIG. 15 is a diagram illustrating an example of a screen displayed by the terminal according to the first example embodiment;

FIG. 16 is a diagram illustrating an example of a screen displayed by the terminal according to the first example embodiment;

FIG. 17 is a diagram illustrating an example of a screen displayed by the terminal according to the first example embodiment;

FIG. 18 is a diagram illustrating an example of a screen displayed by the terminal according to the first example embodiment;

FIG. 19 is a diagram illustrating an example of a screen displayed by the terminal according to the first example embodiment;

FIG. 20 is a diagram illustrating an example of a screen displayed by the terminal according to the first example embodiment;

FIG. 22 is a diagram illustrating an example of field configuration information;

FIG. 23 is a diagram illustrating an example of link information;

FIG. 24 is a diagram illustrating an example of robot management information;

DESCRIPTION OF THE EXAMPLE EMBODIMENTS

Figure 1:
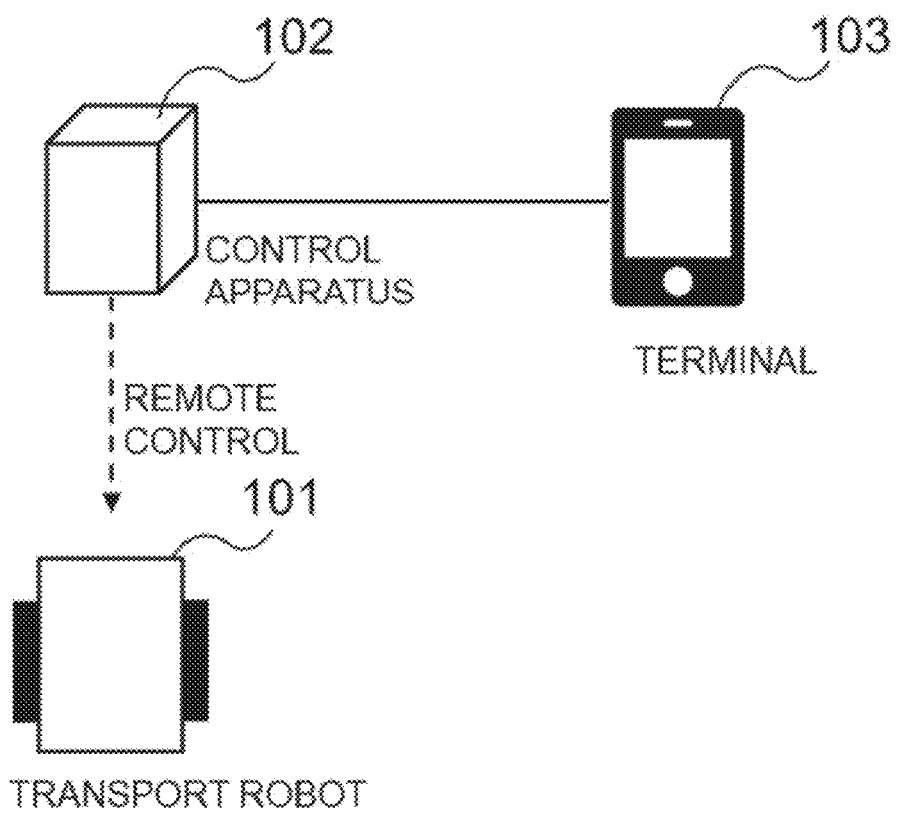
FIG. 1 is a diagram for describing an overview of an example embodiment.

First of all, an overview of an example embodiment will be described. Note that reference signs in the drawings provided in the overview are for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

A transport system according to one example embodiment includes a transport robot 101, a control apparatus 102, and a terminal 103 (see FIG. 1). The transport robot 101 transports an article. The control apparatus 102 controls the transport robot 101. The terminal 103 inputs information related to the transport of the article. The control apparatus 102 identifies a transport destination of the article, based on the information related to the transport of the article obtained from the terminal 103. The control apparatus 102 performs control to transport the article to the identified transport destination.

Figure 2:
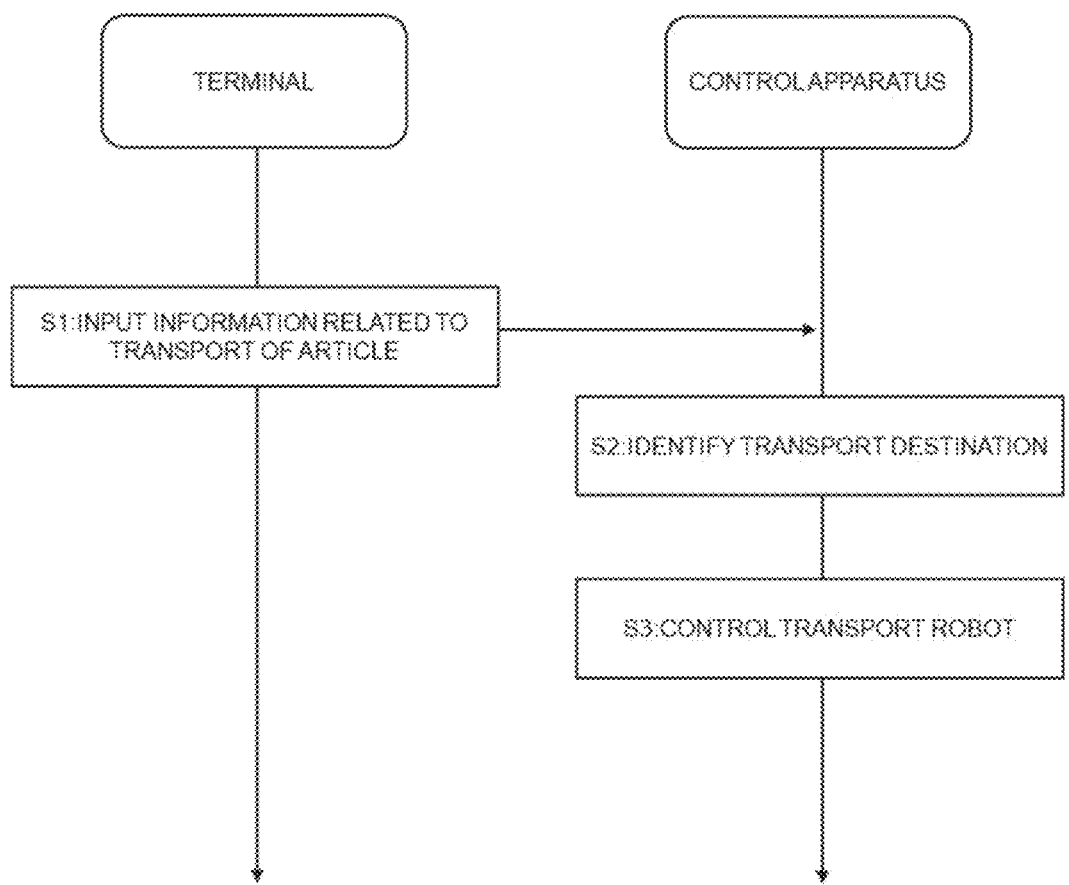
FIG. 2 is a sequence diagram illustrating an example of operation of a transport system according to the example embodiment.

FIG. 2 summarizes operations of the transport system according to the example embodiment. The terminal 103 inputs the information related to the transport of the article (step S1). The control apparatus 102 identifies the transport destination of the article, based on the information related to the transport of the article obtained from the terminal 103 (step S2). The control apparatus 102 performs control (control of the transport robot 101) to transport the article to the identified transport destination (step S3).

In the transport system, the terminal 103 inputs the information related to the transport of the article from a user (operator). The control apparatus 102 controls the transport robot 10, based on the information obtained from the terminal 103. At that time, the control apparatus 102 determines, for example, the transport destination of the article, based on the state of the transport destination of the article (for example, the state of whether or not another article is placed at the transport destination). In other words, in the transport system, even in a case where the article is not successfully transported to the transport destination input by the operator, the control apparatus 102 can determine an appropriate transport destination and perform the transport of the article. As a result, the operator is allowed to input rough information related to the transport destination of the article or the like, and the operator can easily perform input of the information related to the movement of the article.

Specific example embodiments will be described below in further detail with reference to the drawings.

First Example Embodiment

A first example embodiment will be described in further detail with reference to the drawings.

Figure 3:
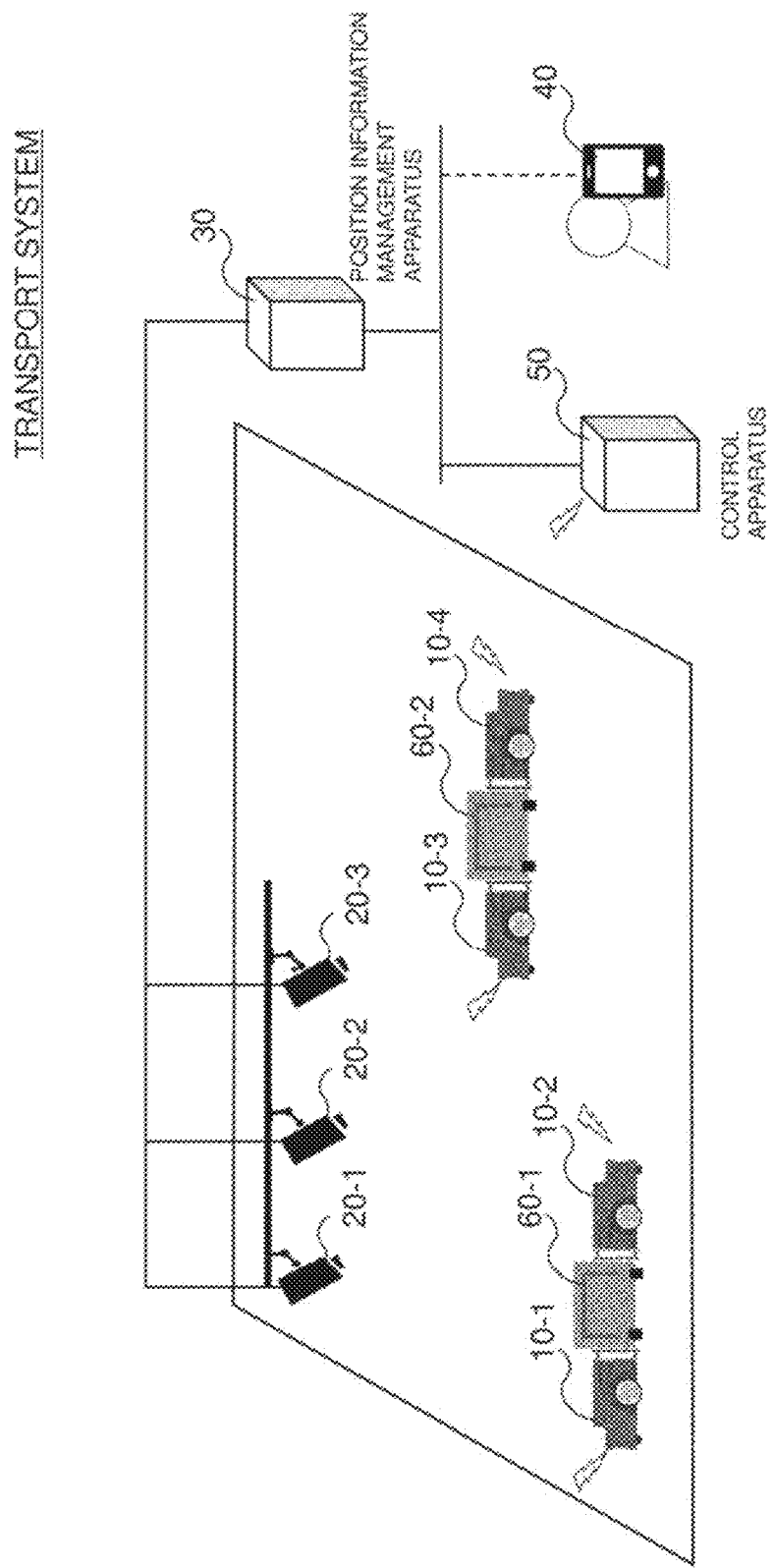
FIG. 3 is a diagram illustrating an example of a schematic configuration of a transport system according to a first example embodiment.

FIG. 3 is a diagram illustrating an example of a schematic configuration of a transport system according to the first example embodiment. With reference to FIG. 3, the transport system includes a plurality of transport robots 10-1 to 10-4, a plurality of camera apparatuses 20-1 to 20-3, a position information management apparatus 30, a terminal 40, and a control apparatus 50.

In the following description, in a case where there is no particular reason for distinguishing the transport robots 10-1 to 10-4, they are simply referred to as "transport robots 10". Other configurations are also described in similar ways. The configuration illustrated in FIG. 3 is an example, and is not to limit the number of transport robots 10 and the like included in the transport system.

The transport robots 10 are robots that transport the articles 60. In the first example embodiment, the transport robots 10 are cooperative transport robots that transport the articles 60 in cooperation with other robots. Two transport robots 10 sandwich an article 60 from opposing directions and move in the sandwiching state to transport the article 60. The transport robots 10 are configured to be able to communicate with the control apparatus 50, and move based on control commands (control information) from the control apparatus 50.

Note that the articles 60 are fixed to carts with wheels. Thus, when two transport robots 10 lightly sandwich an article 60 and move, the article 60 also moves.

The transport robots 10 can move independently, and make pairs with arbitrary transport robots 10 to transport articles 60. For example, in the example of FIG. 3, the transport robot 10-1 and the transport robot 10-2 make a pair, and the transport robot 10-3 and the transport robot 10-4 make a pair. However, the transport robot 10-1 and the transport robot 10-3 may be paired to transport an article 60. Note that, in the following description, a pair consisting of two transport robots 10 will be referred to as a transport robot pair.

Transport robots 10 that are not transporting articles 60 (transport robots 10 that are not making pairs with other transport robots 10) wait at a predetermined position in a field. Although FIG. 3 illustrates pairs of transport robots that are transporting articles 60, there are also transport robots 10 that are waiting at a predetermined position in the field (not illustrated in FIG. 3).

The camera apparatuses 20 are apparatuses that capture the inside of the field. Each of the camera apparatuses 20 includes, for example, a depth camera, a stereo camera, and the like. The depth camera is a camera capable of capturing a depth image in which each pixel value of the image indicates the distance from the camera to an object. The stereo camera is a camera that enables measurement related to the depth direction (height direction) of the object by capturing the object from a plurality of different directions by using two cameras.

The camera apparatuses 20 are installed on ceilings, pillars, or the like. Each camera apparatus 20 is placed such that the inside of the field can be overlooked when pieces of the image data captured by all the camera apparatuses 20 are integrated. In particular, the camera apparatuses 20 are placed such that the details of an area in which the articles 60 are carried in or an area in which the articles 60 are carried out can be grasped.

Each camera apparatus 20 is connected to the position information management apparatus 30. The camera apparatuses 20 capture the inside of the field at a predetermined interval (predetermined sampling cycle), and transmit the image data to the position information management apparatus 30. The camera apparatuses 20 capture the situations in the field in real time and transmit the image data including the situations in the field to the position information management apparatus 30.

The position information management apparatus 30 is an apparatus that performs management related to the positions of the object bodies in the field (for example, a factory or a distribution warehouse). The position information management apparatus 30 identifies object bodies (moving bodies; transport robots 10) located in the field, based on the image data received from the camera apparatuses 20, and also generates position information of the object bodies. For example, in the example of FIG. 3, the position information management apparatus 30 generates position information of the transport robot 10-1 and position information of the transport robot 10-2.

The position information management apparatus 30 generates position information related to object bodies (transport robots 10) in the field. The position information management apparatus 30 calculates the positions (absolute positions) of the object bodies in a three-dimensional coordinate system (X-axis, Y-axis, and Z-axis) having an arbitrary point (for example, an entrance/exit) in the field as an origin. The position information management apparatus 30 transmits the calculated position information of the transport robots 10 (hereinafter referred to as robot position information) to the control apparatus 50.

In addition, the position information management apparatus 30 transmits article existence/non-existence information indicating the existence/non-existence (presence/absence) of the articles 60 at the transport sources or transport destinations of the articles 60 to the control apparatus 50.

The terminal 40 is a terminal used by an operator. Examples of the terminal 40 include a mobile terminal apparatus such as a smartphone, a mobile phone, a game machine, and a tablet, a computer (personal computer, notebook computer). However, it is not to limit the terminal 40 to these examples. The terminal 40 inputs information related to transport of the articles 60 from the operator. Specifically, the terminal 40 identifies the articles 60 to be transported by the transport robot pairs, and displays operation screens (Graphical User Interface (GUI)) for inputting the transport sources and the transport destinations of the articles 60. The terminal 40 generates article transport plan information including the information related to the articles to be transported, the transport sources of the transport target articles, and the transport destinations, based on the information input by the operator. The terminal 40 transmits the generated article transport plan information to the control apparatus 50.

The control apparatus 50 is an apparatus for remotely controlling the transport robots 10. Specifically, the control apparatus 50 controls the transport robots 10 by using the robot position information and the article existence/non-existence information obtained from the position information management apparatus 30, and the article transport plan information obtained from the terminal 40. For example, the control apparatus 50 determines the transport destinations of the articles 60 and calculates the transport routes of the articles 60, based on the states of the transport destinations of the articles 60 obtained from the terminal 40. In addition, the control apparatus 50 remotely controls the transport robots 10, based on the calculated transport routes.

When the control apparatus 50 obtains the article transport plan information from the terminal 40, the control apparatus 50 selects two transport robots 10 from the transport robots 10 waiting in the field.

The control apparatus 50 determines the route, movement destination, and the like of the transport robot pair, based on the article transport plan information, the situations of the field (for example, the presence/absence of an obstacle on the field or the degree of congestion), and the like. The control apparatus 50 transmits control commands (control information) to the two selected transport robots 10 to remotely control these robots.

Each of the two transport robots 10 moves based on the control command from the control apparatus 50, and when contact with the article 60 is detected by a contact sensor or the like, "article sandwiching completion notification" is transmitted to the control apparatus 50. Note that, depending on a control method of the control apparatus 50, it is not necessary to transmit the article sandwiching completion notification from the transport robots 10. For example, the control apparatus 50 may consider that the two transport robots 10 sandwich the object body (article 60) after a predetermined time (for example, 30 seconds) has elapsed since each of the two transport robots 10 has moved to a predetermined position. In other words, the control apparatus 50 may transmit a control command (control information) after the predetermined time has elapsed.

When the control apparatus 50 obtains the article sandwiching notification from each transport robot 10, the control apparatus 50 transmits a control command to each of the two transport robots 10 to remotely control the transport robot pair to move to the transport destination of the article 60. At that time, the control apparatus 50 performs remote control such that the transport robot pair moves to the transport destination while sandwiching the article 60. For example, the control apparatus 50 transmits the control commands (control information) such that the two transport robots 10 move while keeping the distance between the two transport robots 10 facing each other.

Subsequently, the details of each apparatus included in the transport system will be described.

Figure 4:
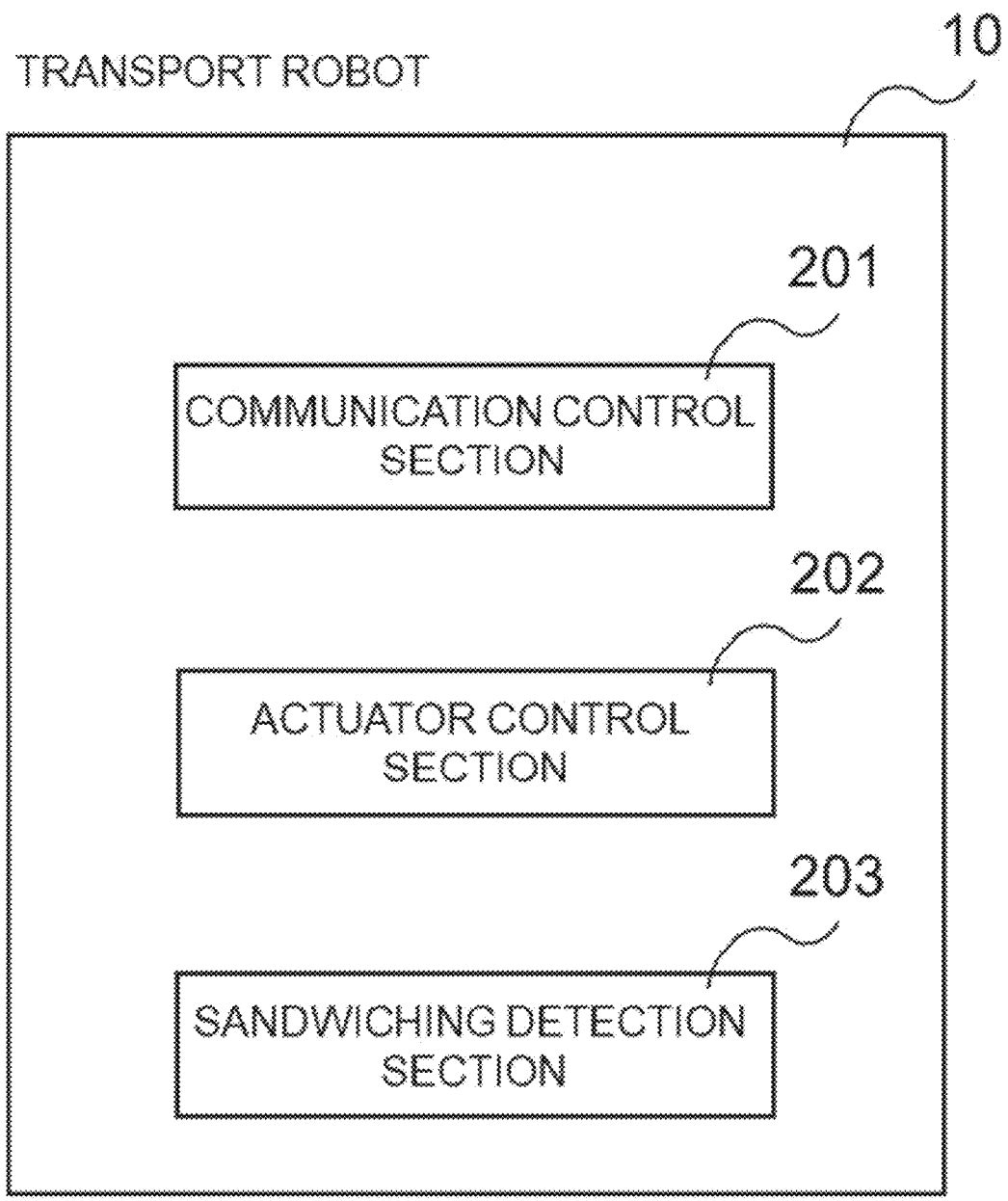
FIG. 4 is a diagram illustrating an example of a processing configuration of a transport robot according to the first example embodiment.

FIG. 4 is a diagram illustrating an example of a processing configuration (processing modules) of the transport robot 10 according to the first example embodiment. With reference to FIG. 4, the transport robot 10 includes a communication control section 201, an actuator control section 202, and a sandwiching detection section 203.

The communication control section 201 is means for controlling communication with the control apparatus 50. The communication control section 201 communicates with the control apparatus 50 by using a wireless communication means such as a wireless Local Area Network (LAN), Long Term Evolution (LTE), or a network used in a specific area such as local 5G.

The actuator control section 202 is means for controlling an actuator composed of a motor or the like, based on a control command (control information) received from the control apparatus 50. For example, the control apparatus 50 transmits the control command including start of rotation of the motor, rotation speed of the motor, stop of rotation of the motor, and the like to the transport robot 10. The actuator control section 202 controls the motor and the like according to the control command The sandwiching detection section 203 is means for detecting that an article 60 is sandwiched with another transport robot 10 making a pair. The transport robot 10 is installed with a "contact sensor" on the surface for sandwiching the article. The sandwiching detection section 203 monitors output of the contact sensor and determines whether or not the sensor has detected contact with an object body. In a case where the contact with the object body (article 60) is detected, the sandwiching detection section 203 transmits an "article sandwiching completion notification" to the control apparatus 50 via the communication control section 201.

Figure 5:
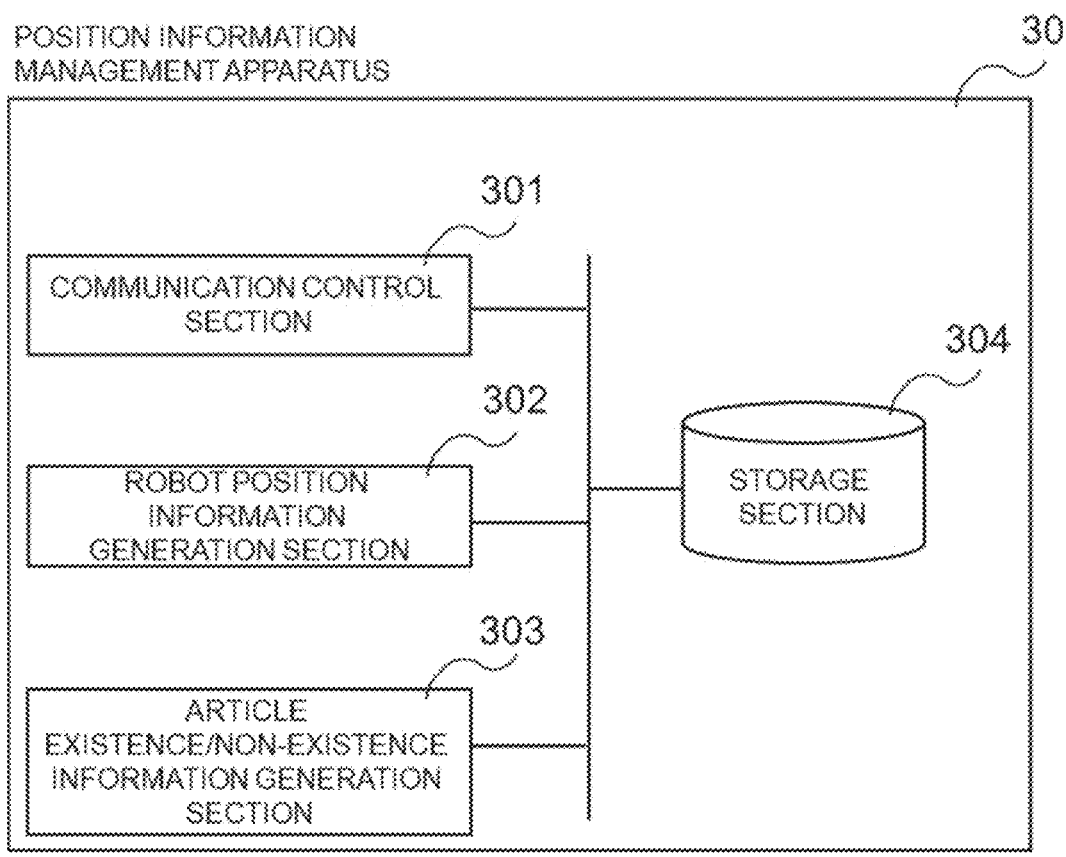
FIG. 5 is a diagram illustrating an example of a processing configuration of a position information management apparatus according to the first example embodiment.

FIG. 5 is a diagram illustrating an example of a processing configuration (processing modules) of the position information management apparatus 30 according to the first example embodiment. With reference to FIG. 5, the position information management apparatus 30 includes a communication control section 301, a robot position information generation section 302, an article existence/non-existence information generation section 303, and a storage section 304.

The communication control section 301 is means for controlling communication with other apparatuses (for example, the camera apparatuses 20 or the control apparatus 50) connected by wire (for example, LAN, optical fiber, or the like) or wirelessly.

The robot position information generation section 302 is means for generating the above-mentioned robot position information. The robot position information generation section 302 generates the robot position information, based on the image data obtained from the camera apparatuses 20.

Each of the camera apparatuses 20 transmit the image data to the position information management apparatus 30 together with the own identifier (ID). The robot position information generation section 302 identifies the camera apparatus 20 that is the transmission source of the image data from the identifier of the camera apparatus 20. Because the camera apparatus 20 is fixed to the ceiling or the like, the camera apparatus 20 continuously transmit image data of predetermined area in the field to the position information management apparatus 30.

Figure 6:
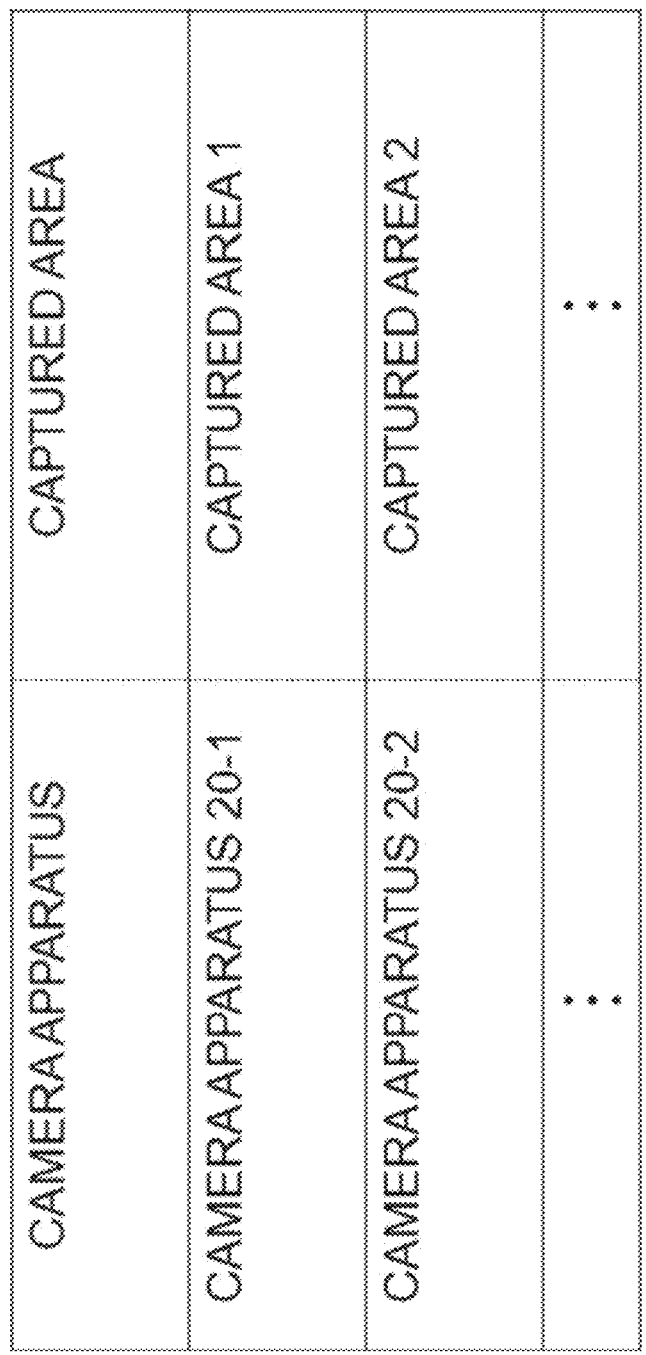
FIG. 6 is a diagram illustrating an example of information in which identifiers of camera apparatuses and areas captured by the camera apparatuses are associated with each other.

The robot position information generation section 302 detects object bodies by, for example, the following method. The storage section 304 stores information in which the identifier of each camera apparatus 20 and the area captured by the camera apparatus 20 are associated with each other (see FIG. 6). By referring to the associated information, the robot position information generation section 302 can grasp which area in the field obtained image data corresponds to.

The storage section 304 stores initial image data of the area captured by each camera apparatus 20. The initial image data is image data in which object bodies (transport robots 10) that do not exist in the initial state are not imaged in the field. The robot position information generation section 302 compares the obtained image data with the corresponding initial image data, and when difference is found, determines that the image data includes an object body to be detected.

Figure 7:
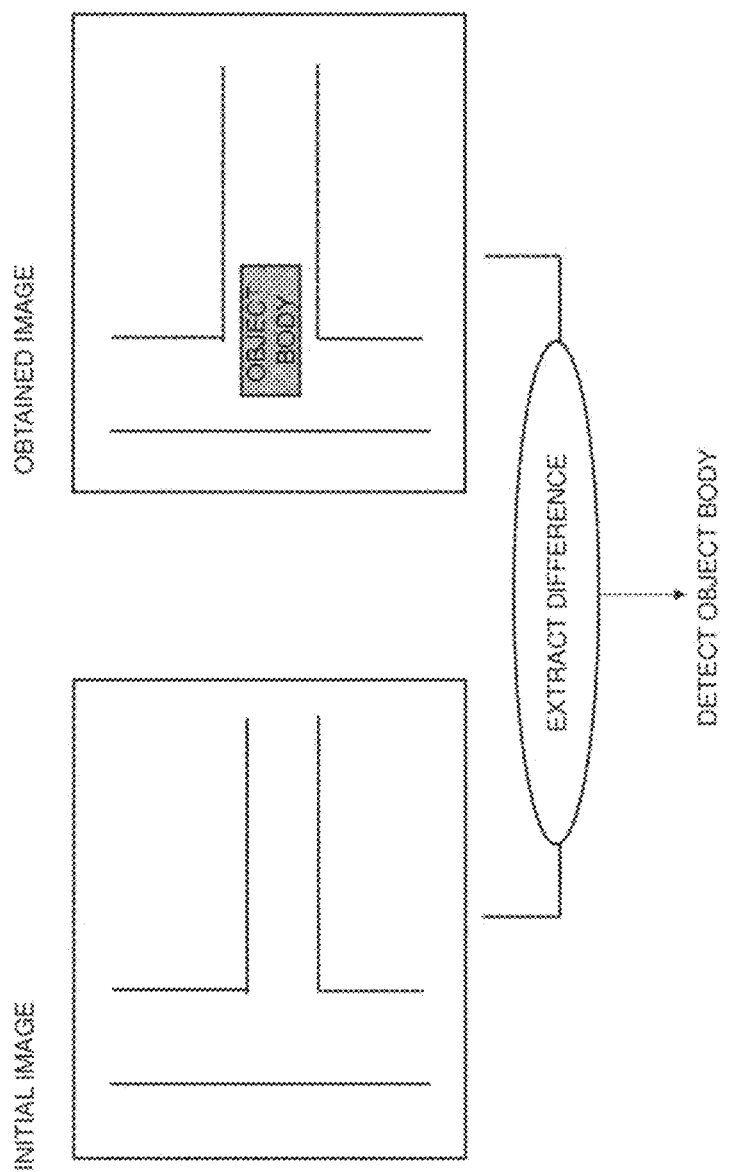
FIG. 7 is a diagram for describing operation of a robot position information generation section.

For example, the storage section 304 stores initial image data as illustrated on the left side of FIG. 7. The image illustrated on the right side of FIG. 7 is an image obtained from the camera apparatus 20. The robot position information generation section 302 calculates the difference between the two pieces of image data and detects the object body included in the obtained image on the right side. Note that, in a case where the initial state in the field is changed, the initial image data stored in the storage section 304 is updated. For example, the initial image data is updated in a case where the layout of the factory or the like is changed.

Note that the robot discrimination by the robot position information generation section 302 is not limited to the method using the initial image data. For example, the robot position information generation section 302 may calculate the coordinates of the transport robots 10 and detect the transport robots 10 exist on the passage (on the link), based on the coordinates of the object bodies and the normal coordinate information of the field.

When the robot position information generation section 302 detects an object body in the field, the robot position information generation section 302 approximates the object body to, for example, a rectangular shape, and calculates the coordinates of the four points. Specifically, the robot position information generation section 302 calculates the relative coordinates (X coordinate and Y coordinate) of the object body with respect to the absolute coordinates of the reference point, based on the number of pixels from the reference point (for example, the lower left of the image) in the image data to the object body. At that time, the robot position information generation section 302 calculates the relative coordinates of the object body, based on the information (resolution of the imaging element or the like) of the camera apparatus 20 from which the image data has been obtained.

The absolute coordinates of the reference point of the obtained image data are known in advance. The robot position information generation section 302 calculates the absolute coordinates (X and Y coordinates) of the object body in the field by adding the calculated relative coordinates of the object body to the absolute coordinates of the reference point. In addition, in a case where the image data is captured by a depth camera, the robot position information generation section 302 reads out a pixel value corresponding to the calculated X and Y coordinates to obtain the Z coordinate (height) of the object body.

The robot position information generation section 302 calculates the absolute positions of the four points forming the object body by executing such processing for the four corners of the object body.

Next, the robot position information generation section 302 determines the type of the object body included in the obtained image. The robot position information generation section 302 calculates the size of the detected object body from the absolute coordinates of the four points. The robot position information generation section 302 can determine the type of the object body, based on the calculated size. For example, because the sizes of the transport robots 10 are known in advance, when the size of the object body and the size of a transport robot 10 match, the robot position information generation section 302 determines that the detected object body is the transport robot 10. On the other hand, in a case where the size of the detected object body and the sizes of the transport robots 10 do not match, the robot position information generation section 302 determines that the detected object body is "other than the transport robots" (for example, determines as an obstacle in the field).

Note that the method of determining whether or not the object body is a transport robot, based on the size of the object body is an example, and other methods can be used. For example, markers having identification functions such as QR codes (registered trademark) or Augmented Reality (AR) markers may be attached to the transport robots 10, and the robot position information generation section 302 may identify the transport robots 10 (determine whether or not the object body is a transport robot 10) by reading the markers. Alternatively, the identification of the transport robots 10 may be performed by the robot position information generation section 302 transmitting specific signals or messages to the transport robots 10, and the transport robots 10 that receive the signals or the like responding with the identification numbers or the like. In other words, the robot position information generation section 302 can perform the identification of the transport robots 10 by signals or the like from the transport robots 10 without assigning identification information (for example, characters or patterns) on the outsides of the transport robots 10.

The robot position information generation section 302 transmits the identifiers of the detected transport robots 10 and their absolute positions to the control apparatus 50. Note that the absolute position of the object body may be the calculated absolute coordinates of the four points forming the object body, or may be the absolute coordinates of one point representing the object body (for example, the center of the object body).

FIG. 8 is a diagram illustrating an example of the robot position information transmitted from the position information management apparatus 30. Note that, as illustrated in FIG. 8, in a case where a plurality of transport robots 10 are detected from the image data, the robot position information related to these transport robots 10 may be collectively transmitted to the control apparatus 50. As described above, the position information management apparatus 30 generates the position information of the transport robots 10 and transmits the generated position information to the control apparatus 50.

The article existence/non-existence information generation section 303 is means for generating article existence/non-existence information indicating the states of the areas (article placement areas described later) in which the articles 60 are carried in or out.

Figure 9:
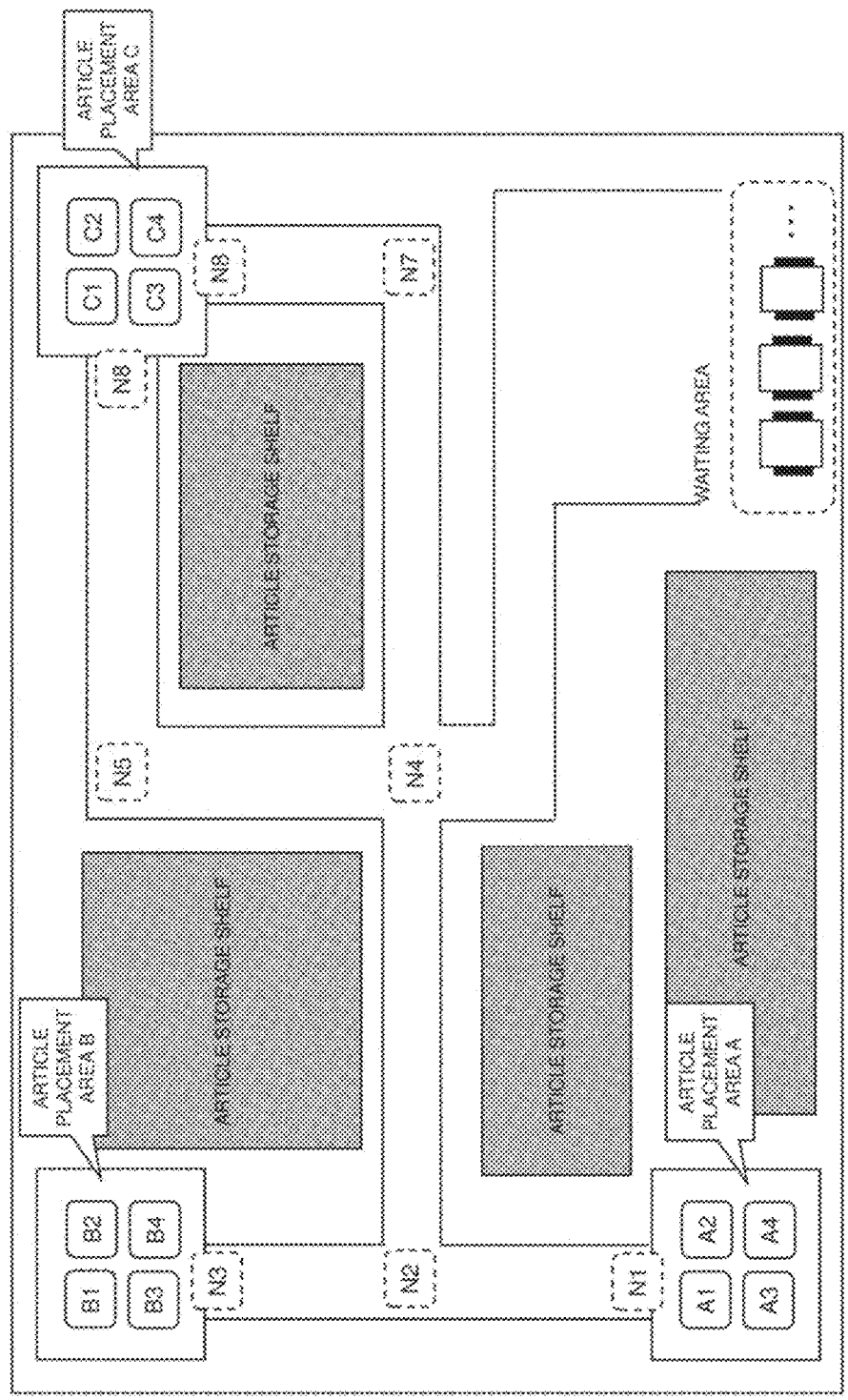
FIG. 9 is a diagram illustrating an example of a field configuration according to the first example embodiment.

FIG. 9 is a diagram illustrating an example of a field configuration of the transport system according to the first example embodiment. As illustrated in FIG. 9, the field includes "article placement areas" which are transport sources or transport destinations of the articles 60. For example, the article placement areas may be areas where the articles 60 are carried in from the outside or warehouses where the carried-in articles 60 are temporarily stored.

The article existence/non-existence information generation section 303 generates, for example, article existence/non-existence information indicating the presence/absence of the articles in the article placement areas. For example, in the example of FIG. 9, information indicating whether or not articles are placed in each article placement area is generated.

Alternatively, as illustrated in FIG. 9, in a case where the inside of each article placement area is managed in a more subdivided manner, the article existence/non-existence information generation section 303 may generate article existence/non-existence information indicating the presence/absence of articles in small areas constituting each article placement area, for example. For example, as illustrated in FIG. 9, the insides of the article placement areas may be divided according to the shippers or the purposes. In the example of FIG. 9, each article placement area is divided into four small areas. In other words, the article existence/non-existence information generation section 303 may manage a plurality of small areas collectively (as a group) as an article placement area.

The storage section 304 stores article placement area configuration information for managing the configuration of each article placement area.

FIG. 10 is a diagram illustrating an example of the article placement area configuration information. With reference to FIG. 10, in the article placement area configuration information, identification information of small areas included in each article placement area, coordinate information of the small areas (absolute positions of the small areas determined in advance), and the existence/non-existence of the articles 60 in the small areas are managed in association with each other.

Here, the camera apparatuses 20 are placed such that the whole of each article placement area can be grasped. The article existence/non-existence information generation section 303 identifies the article placement area captured by the camera apparatus 20 from the identifier of the camera apparatus 20 transmitted from the camera apparatus 20 together with the image data. The article existence/non-existence information generation section 303 identifies the absolute position of an object body shown in the image data, similarly to the approach of calculating the absolute positions of the transport robots 10. The article existence/non-existence information generation section 303 refers to the article placement area configuration information as illustrated in FIG. 10, and specifies which small area of an article placement area includes the absolute position of the identified object body.

As a result of the determination, when the article 60 is placed in the small area, the article existence/non-existence information generation section 303 describes "article present" in the corresponding placement state field. After that, the article existence/non-existence information generation section 303 associates the identifier of the small area where the article 60 is placed with information indicating that the article 60 is placed to be the article existence/non-existence information, and transmits the article existence/non-existence information to the control apparatus 50.

For example, the article existence/non-existence information generation section 303 transmits the article existence/non-existence information as illustrated in FIG. 11 to the control apparatus 50.

In a case where the article existence/non-existence information generation section 303 analyzes image data obtained from a camera apparatus 20, and finds that an article 60 placed in a small area is moved and does not exist, the article existence/non-existence information generation section 303 updates the corresponding placement state field in the article placement area configuration information to "article absent". For example, the article existence/non-existence information generation section 303 compares the image data of the small area with the initial image data, and determines that the article 60 does not exist in the small area when there is no difference between the image data of the small area and the initial image data. The article existence/non-existence information generation section 303 transmits the article existence/non-existence information as illustrated in FIG. 12 to the control apparatus 50 also when the article 60 placed in the small area is removed.

Figure 13:
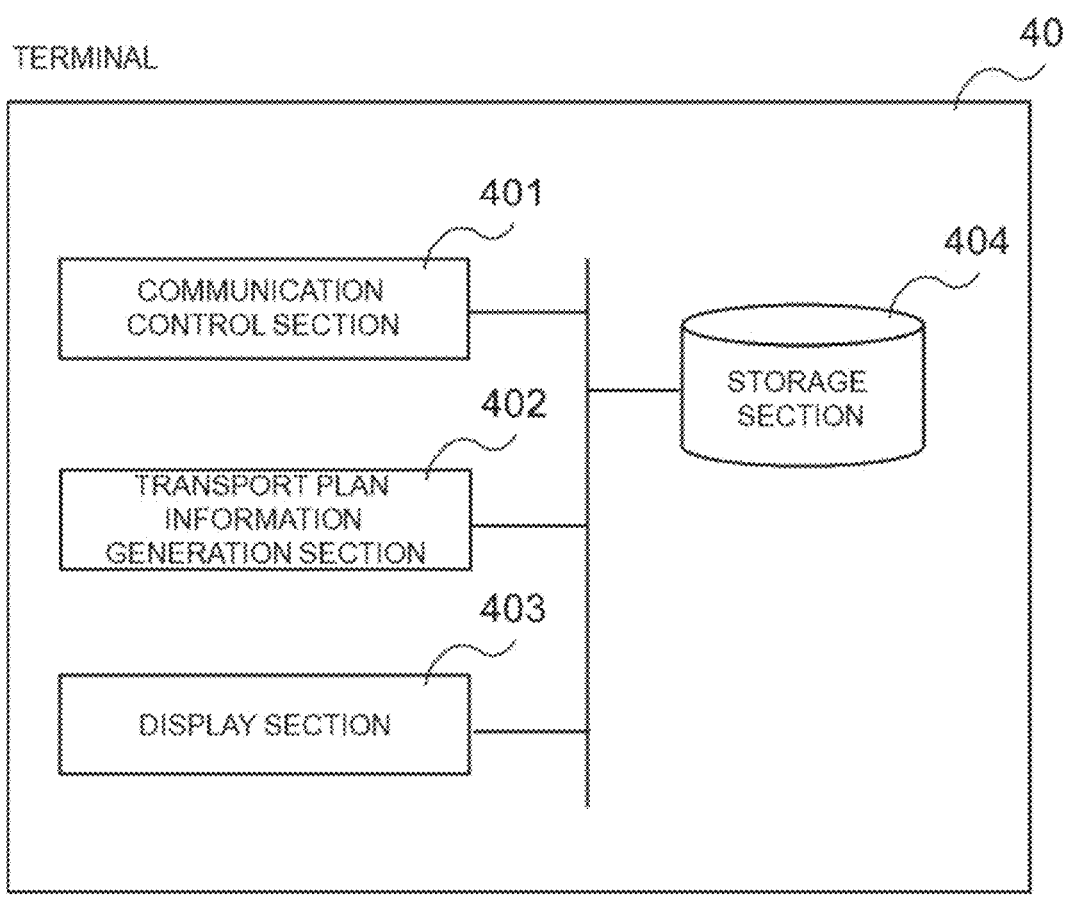
FIG. 13 is a diagram illustrating an example of a processing configuration of a terminal according to the first example embodiment.

FIG. 13 is a diagram illustrating an example of a processing configuration (processing modules) of the terminal 40 according to the first example embodiment. With reference to FIG. 13, the terminal 40 includes a communication control section 401, a transport plan information generation section 402, a display section 403, and a storage section 404.

The communication control section 401 is means for controlling communication with other apparatuses (control apparatus 50), similarly to the communication control section 201 of the transport robot 10.

The transport plan information generation section 402 is means for generating the above-mentioned article transport plan information. The transport plan information generation section 402 identifies the articles 60 to be transported by the operators, and generates information related to the GUI for inputting the transport sources or the transport destinations of the articles 60. The transport plan information generation section 402 delivers the generated GUI information to the display section 403. The display section 403 displays the GUI information on a liquid crystal display or the like.

The transport plan information generation section 402 generates, for example, a GUI for inputting (specifying) a transport source or a transport destination of an article 60 in the field configuration as illustrated in FIG. 9, and provides the GUI to an operator. The transport plan information generation section 402 transmits the information input by the operator in accordance with the GUI to the control apparatus 50. Specifically, the transport plan information generation section 402 associates information for identifying the article 60 to be transported (for example, the article name, the serial number, or the like), the place where the article 60 is placed (transport source), and the transport destination of the article 60 with each other, and transmits the information to the control apparatus 50 as article transport plan information.

Figure 14:
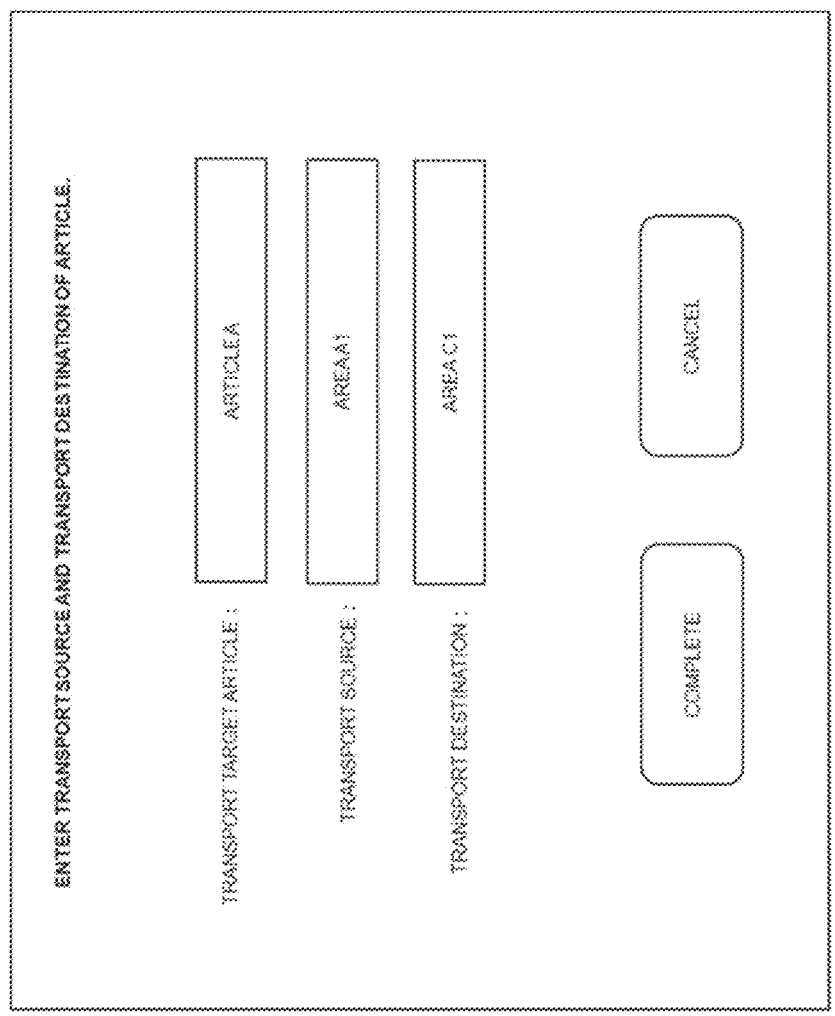
FIG. 14 is a diagram illustrating an example of a screen displayed by the terminal according to the first example embodiment.

For example, the transport plan information generation section 402 generates a GUI as illustrated in FIG. 14. According to FIG. 14, the operator can specify the small area where the article 60 is placed and the small area to which the article 60 is transported by pull-down input or character input.

Alternatively, the transport plan information generation section 402 may specify an article placement area as the transport destination (see FIG. 15). As mentioned above, the article placement area includes a plurality of small areas. Therefore, the transport plan information generation section 402 may specify an article placement area that is collectively managed (grouped) as the transport destination. As described above, the operator may specify the article placement area where the article 60 is placed, and specify the article placement area to which the article 60 is delivered. In the example of FIG. 15, the article A is placed in the small area A1 included in the article placement area A, and the article A is transported to any one of the four small areas of the article placement area C.

Alternatively, as illustrated in FIG. 16, the transport destination or the like may be specified by a plurality of small areas. In the example of FIG. 16, the article A is carried out from the small area A1 of the article placement area A, and is transported to any of the small areas C1 or C2 of the four small areas C1 to C4 of the article placement area C. Note that, although the example of FIG. 16 illustrates that a plurality of small areas are specified as the transport destination, a plurality of article placement areas may be specified as the transport destination. For example, as the transport destination, a plurality of article placement areas may be specified as the transport destination or the like, such as "article placement area A or B".

Alternatively, as illustrated in FIG. 17, the transport destination or the like may be specified by a relative position in the article placement area. For example, as illustrated in FIG. 17, in a case where "the upper side of the article placement area C" is specified, the area C1 or C2 located on the north side (upper side in the drawing) in the field illustrated in FIG. 9 will be specified as the transport destination. Similarly, when "the right side of the article placement area C" is specified, the area C2 or C4 will be specified as the transport destination. Alternatively, the transport destination may be specified according to field-specific conditions such as "the seaside area of the article placement area C" or "the highway side of the article placement area C". In this case, the relationships between the directions indicated by the specific conditions and the small areas in the article placement areas may be stored in the storage section 404 in advance. For example, a correspondence relationship such as "the seaside area of the article placement area C=the small area C1 or C2" may be stored in the storage section 404 in advance.

The transport plan information generation section 402 may generate a GUI capable of inputting supplementary information related to the transport of the article 60 in addition to the information related to the article 60 to be transported, the transport source, and the transport destination.

For example, as illustrated in FIG. 18, in a case of directly specifying a small area to which the article 60 is transported, the operator may select whether or not to permit transport to other small areas of the article placement area to which the specified small area belongs. For example, when "permit transport to other areas" is set to "Yes", in a case where an article is already placed in the area C1 and the article A is not successfully transported to the area C1, the article A is transported to any of the other small areas C2 to C4 included in the same article placement area C. On the other hand, when the setting is set to "No", the article A that is not successfully transported to the area C1 is returned to the transport source area A1 or is transported to a predetermined area.

Alternatively, as illustrated in FIG. 19, a mode of article transport by a transport robot pair may be selected. Examples of the mode of article transport include "normal operation", "one-way operation", and "loop operation".

The normal operation is a mode in which a transport robot pair transports an article 60 from a transport source to a transport destination specified by article transport plan information. In this case, the transport robot pair repeats the transport until the operator modifies the article transport plan information. In other words, when the transport of the article 60 to the transport destination is completed, the transport robot pair returns to the specified transport source and transports an article 60 to the transport destination again. As described above, during the normal operation, the transport robot pair performs article transport of transporting articles 60 in one direction (single direction) from the transport source to the transport destination.

The one-way operation is a mode in which a transport robot pair transports an article 60 from a transport source to a transport destination specified by article transport plan information only once. In this case, the transport robots 10 return to the waiting area or the like when the transport of the article 60 is completed. Therefore, at the time of the one-way operation, the operator needs to input information such as a transport source and a transport destination each time.

The loop operation is a mode in which a transport robot pair moves back and forth between a transport source and a transport destination specified by article transport plan information to transport an article 60. In this case, the transport robot pair transports an article 60 placed at the transport source to the transport destination, and similarly, transports an article 60 placed at the transport destination to the transport source. As described above, in the loop operation, not only the article transport from the transport source to the transport destination in only one direction is performed, but also the bidirectional transport in which the article movement is repeated between the transport source and the transport destination is performed.

Note that, in a case where a transport mode of article is specified, it is not necessary to specify the articles to be transported. In other words, in a case where a transport robot pair reciprocates between two points as in the normal operation or the loop operation, the transport robot pair may transport an arbitrary article 60 placed at a specified place to a specified destination.

In a case where a mode of article transport is specified, the control apparatus 50 may select transport robots to be used for transport, depending on the articles 60 of the transport source. For example, the control apparatus 50 may select a transport robot pair according to conditions such as the amount, the sizes, and the priority of the articles 60 placed at the transport source. For example, in a case where the amount of the articles 60 at the transport source is large, the control apparatus 50 may select a plurality of transport robot pairs. When the articles 60 placed at the transport source is large, the control apparatus 50 may select, for example, three or more transport robots 10, or may select transport robots 10 with special specifications for transporting large articles.

In a case where the articles 60 placed at the transport source has a high priority (for example, articles to be transported immediately, articles that easily lose freshness, articles that should not be subject to temperature changes, articles with close delivery dates, or the like), the control apparatus 50 may select transport robot pairs so as to transport the articles in preference to other articles. Note that the control apparatus 50 may select transport robot pairs by simultaneously examining a plurality of such conditions related to the articles. For example, in a case where the priority is high, large articles are placed at the transport source, and a transport robot 10 with special specifications for transporting large articles cannot be used due to the transport robot transporting other articles, a plurality of small transport robots 10 may be selected.

An example has been described in which the control apparatus 50 performs the selection of the transport robots 10 according to the conditions of the articles placed at the transport source, but the present invention is not limited thereto. Although the case in which the control apparatus 50 performs the selection of the transport robot pairs has been described, the operator may input the selection, based on such conditions. Regarding the mode of article transport, the operator may perform the specification of the transport robots 10 to perform the mode of article transport by using a GUI (see FIG. 20). For example, the operator may specify the transport robots 10 to perform the mode of article transport by inputting the names of the specific transport robots 10 or the conditions of special specifications necessary for the transport of the articles 60.

Note that optional information (transport mode) specified by article transport plan information may define the operation related to transport robot pairs as described above, or may define the operation related to article transport between points (transport source and transport destination). For example, suppose that contents such as to transport articles 60 from the article placement area A to the article placement area D by "normal operation" are input. In this case, the control apparatus 50 transports a first article 60 placed in the article placement area A to the article placement area D by a pair consisting of the transport robots 10-1 and 10-2. After that, the control apparatus 50 transports a second article 60 placed in the article placement area A to the article placement area D by a pair consisting of the transport robots 10-3 and 10-4.

As described above, the transport mode specified by the article transport plan information may define the operation of specific transport robot pairs, or may define the article transport mode for the entire system. Alternatively, a GUI may be provided to input the interpretation of the transport mode specified in the article transport plan information. In other words, a GUI that allows input such as "transport mode=individual transport robot pair" or "transport mode =entire system" may be provided to the operator.

The transport plan information generation section 402 generates the article transport plan information, based on the information obtained from the operator via the GUI. Specifically, the transport plan information generation section 402 generates article transport plan information including information for identifying the articles 60 to be transported (identifiers of the articles 60), and information related to the transport source and the transport destination of the articles 60. For example, in the example of FIG. 14, article transport plan information including the transport target article=article A, the transport source=area A1, and the transport destination=area C1 is generated. In addition, as illustrated in FIGS. 18 and 19, in a case where supplementary information (transport permission to other areas, article transport mode) exists, the transport plan information generation section 402 generates the article transport plan information including the supplementary information (optional information).

The transport plan information generation section 402 transmits the generated article transport plan information to the control apparatus 50.

Note that the storage section 404 of the terminal 40 may manage the names of the transport destinations of the articles 60 in association with the position information, and the terminal 40 may identify the position information of the transport destination, based on the input name of the transport destination, and transmit the identified position information to the control apparatus 50. For example, the storage section 404 may store information as illustrated in FIG. 10, and the transport plan information generation section 402 may derive the position information (coordinates of a small area) from the name of the transport destination (for example, small area A1 or the like) input by the operator with reference to the information. The transport plan information generation section 402 may transmit the article transport plan information including the derived position information to the control apparatus 50.

As described above, the terminal 40 transmits first position information (information of transport source) and second position information (information of transport destination) to the control apparatus 50. The control apparatus 50 controls the transport robots 10 such that the articles 60 existing in the place (transport source) corresponding to the first position information are transported to the place (transport destination) corresponding to the second position information.

Figure 21:
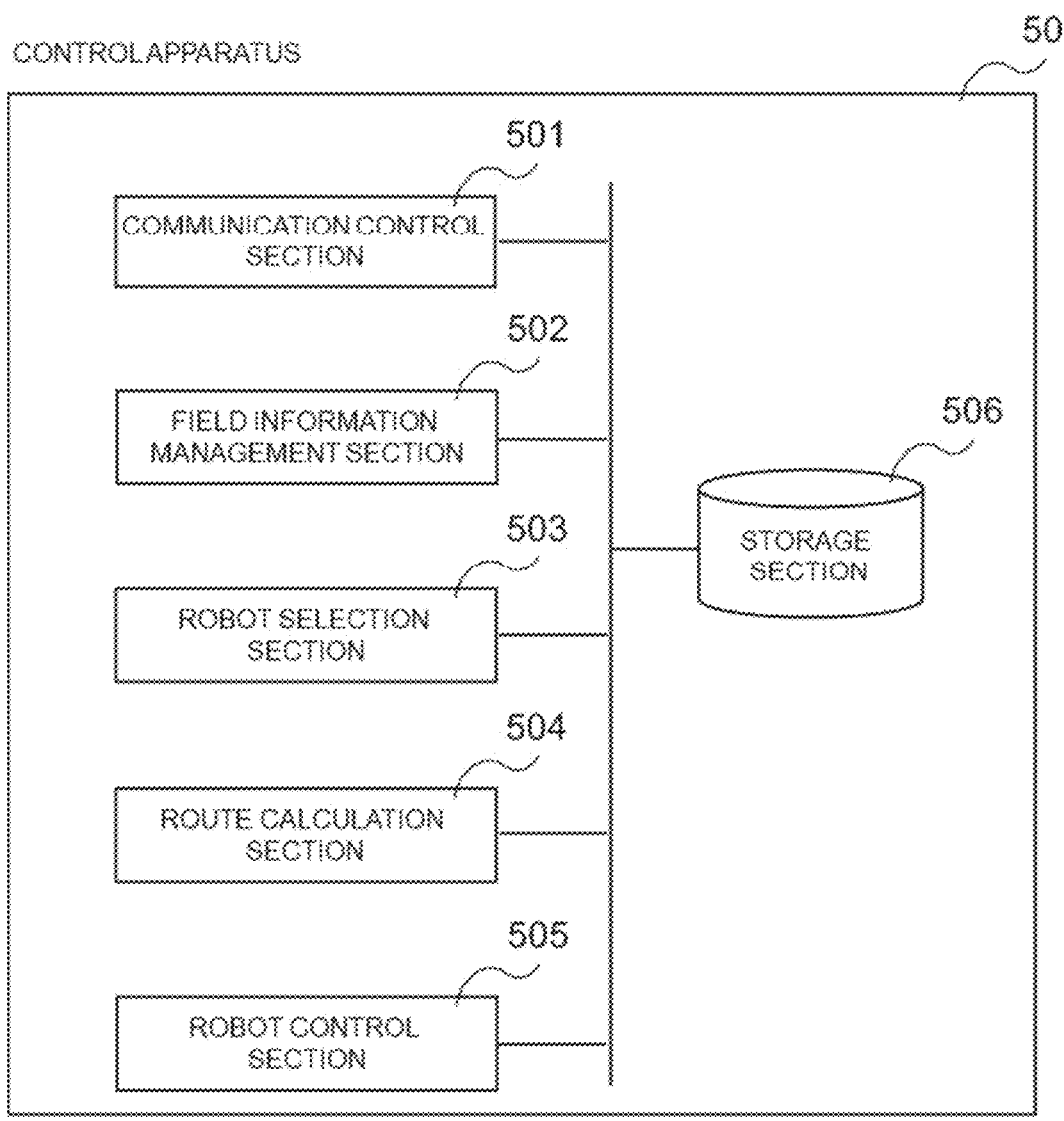
FIG. 21 is a diagram illustrating an example of a processing configuration of a control apparatus according to the first example embodiment.

FIG. 21 is a diagram illustrating an example of a processing configuration (processing modules) of the control apparatus 50 according to the first example embodiment. With reference to FIG. 21, the control apparatus 50 includes a communication control section 501, a field information management section 502, a robot selection section 503, a route calculation section 504, a robot control section 505, and a storage section 506.

The communication control section 501 controls communication with other apparatuses, similarly to the communication control section 301 of the position information management apparatus 30 and the like. In a case where the communication control section 501 obtains robot position information and article existence/non-existence information from the position information management apparatus 30, and obtains article transport plan information from the terminal 40, the communication control section 501 stores these pieces of information in the storage section 506.

The field information management section 502 is means for managing map information, link information, and the like of the field.

The storage section 506 stores field configuration information indicating the configuration of the field. Here, in the disclosure of the present application, start points, end points, branch points, and the like of passages through which transport robots 10 can pass are regarded as nodes. The field configuration information defines the absolute coordinates of the nodes.

For example, suppose that the field configuration is as illustrated in FIG. 9. In this case, the absolute coordinates of the node N1, the node N2, and the like are defined by the field configuration information (see FIG. 22).

The storage section 506 stores link information for storing the connection relationships of the nodes and the distances between the nodes forming the links in association with each other. For example, in the example of FIG. 22, the link information as illustrated in FIG. 23 is stored. Because the field configuration is predetermined, the distance between the nodes constituting each link can also be calculated in advance. The distances between the nodes are calculated before operating the system and written in the link information.

The storage section 506 stores article placement area configuration information for managing the situations of the article placement areas. Specifically, the same information as the article placement area configuration information described with reference to FIG. 10 is also stored in the storage section 506 of the control apparatus 50.

The field information management section 502 performs the update of the article placement area configuration information every time article existence/non-existence information is obtained from the position information management apparatus 30. Specifically, the field information management section 502 updates the placement state field corresponding to the small areas described in the article existence/non-existence information, based on the article existence/non-existence information. Therefore, the control apparatus 50 can grasp the current situations of the article placement areas (presence/absence of articles 60 in each small area) by referring to the article placement area configuration information.

The field information management section 502 updates the current position field of robot management information described later, based on the absolute coordinates of the transport robots 10 read from the robot position information.

The robot selection section 503 is means for selecting transport robots 10 for transporting articles 60. Specifically, when the robot selection section 503 obtains article transport plan information from the terminal 40, the robot selection section 503 selects transport robots 10 for transporting articles 60 described in the information. The robot selection section 503 selects two transport robots 10 from a plurality of transport robots 10 waiting in the waiting area.

The robot selection section 503 may select two transport robots 10, based on any criteria. For example, the robot selection section 503 may select transport robots 10 closest to the transport source described in the transport plan information, or may select transport robots 10 in the order of the shortest operating time. Alternatively, in a case where the remaining battery levels can be obtained from the transport robots 10, the robot selection section 503 may select the robots having the largest remaining battery levels in order. Alternatively, the robot selection section 503 may select transport robots 10 with special specifications according to the articles 60. For example, in a case where the articles 60 are extremely heavy, transport robots 10 for transporting heavy objects may be selected, and when the articles 60 are lightweight, transport robots 10 for transporting lightweight objects may be selected.

The robot selection section 503 notifies the route calculation section 504 and the robot control section 505 of the selected transport robots 10 (transport robot pairs). The robot selection section 503 reflects the information related to the selected transport robots 10 in the robot management information. Note that the details of the robot management information will be described later.

The route calculation section 504 is means for calculating routes for transport robot pairs to transport articles 60 from the transport source to the transport destination, based on article transport plan information and article placement area configuration information generated by the terminal 40.

When there is space to transport articles 60 in specified transport destination (small areas specified by article transport plan information, or the like) (when the transport destination is not filled), the route calculation section 504 calculates a route for transporting articles 60 placed at the transport source to the vacant transport destination. For example, as illustrated in FIG. 14, in a case where the transport source and the transport destination of articles 60 are specified as a small area, the route calculation section 504 reads the coordinates of the small area from the article placement area configuration information, and calculates the route from the transport source to the transport destination. In the example of FIG. 14, the transport route from the area A1 to the area C1 is calculated.

Alternatively, the route calculation section 504 may calculate a route for transporting articles 60, based on the situations of transport destination. For example, as illustrated in FIG. 15, in a case where the transport destination of articles 60 is specified as an article placement area, the route calculation section 504 selects one from the small areas included in the article placement area specified as the transport destination and sets the small area as the transport destination. For example, the route calculation section 504 refers to the article placement area configuration information and selects a small area in which articles 60 are not placed among the small areas included in the specified article placement area. The route calculation section 504 sets the selected small area as the transport destination. Alternatively, when articles 60 are not placed in all of the small areas included in the specified article placement area, the route calculation section 504 may select a small area near the entrance/exit of the article placement area.

For example, as illustrated in FIG. 16, in a case where a plurality of small areas are specified as transport destinations, the route calculation section 504 sets a small area in which articles 60 are not placed among the specified small areas as the transport destination. Alternatively, as illustrated in FIG. 17, in a case where small areas are specified as a transport destination by a relative position in the article placement area, the route calculation section 504 may identify a specified small area from the coordinates of the small area and set the identified small area as the transport destination. For example, in the example of FIG. 17, of the small areas C1 and C2 included in the article placement area C illustrated in FIG. 9, a small area in which articles 60 are not placed is selected as the transport destination.

Note that, as illustrated in FIG. 18, when the article transport plan information includes supplementary information and the information is related to "permit transport to other areas", the route calculation section 504 determines the transport destination in consideration of the information. Specifically, even in a case where articles 60 are placed in a small area specified as a transport destination, when articles 60 are not placed in another small area belonging to the same article placement area, the route calculation section 504 sets such another small area as the transport destination.

As described above, the route calculation section 504 determines transport source and transport destination of articles 60, based on article transport plan information and article placement area management information, and calculates the route from the transport source to the transport destination. For example, the route calculation section 504 confirms the situations (presence/absence of articles 60) of transport destination (goal point), and gives up the transports to transport destination when articles 60 are placed at the transport destination. Alternatively, the route calculation section 504 may determine whether or not there is an area to transport by alternative, and may transport articles 60 to the alternative area, such as in a case where transports to other areas are permitted. Alternatively, the route calculation section 504 may confirm the states (situations) of transport destination specified in article transport plan information after a predetermined time has elapsed, and determines transport destination of articles 60 after confirming that articles are not placed at the transport destination (after confirming that there are vacancies in the transport destination). Note that determined transport sources and transport destinations of articles 60 are reflected in robot management information described later.

The route calculation section 504 may calculate the degree of congestion of transport destination of articles 60 and determine transport destination of articles 60 according to the calculated degree of congestion. For example, the position information management apparatus 30 notifies the control apparatus 50 of the size(s) of articles 60 placed in a small area. The control apparatus 50 calculates the degree of congestion of the small area which is a transport destination (ratio of the size(s) of the articles 60 to the area of the small area), based on the notified size(s) of the articles 60. When the degree of congestion is high, the route calculation section 504 determines that it is difficult to further place articles 60 in the small area, and attempts to transport the articles 60 to another small area. Specifically, in a case where transports to other small areas are permitted, the route calculation section 504 determines a small area with a low degree of congestion as the transport destination of the articles 60. Note that the number of articles 60 that can be placed in one small area is not limited to one. When the degree of congestion is lower than a predetermined threshold value, the route calculation section 504 may determine that articles 60 can be transported to the small area and select the small area as the transport destination.

The route calculation section 504 calculates the route for transporting the articles 60 from the transport source to the transport destination by using route search algorithms such as Dijkstra's algorithm and Bellman—Ford algorithm. For example, in a case of transporting from the area A1 to the area C1, the route via the nodes N1, N2, N4, N5, and N8 is calculated.

The route calculation section 504 refers to the link information at the time of route calculation. The route calculation section 504, for example, treats each distance between nodes as a cost of a link to calculate the transport route.

The route calculation section 504 manages calculated route and transport robots 10 using the route in association with each other. Specifically, the route calculation section 504 updates robot management information stored in the storage section 506.

FIG. 24 is a diagram illustrating an example of robot management information. With reference to FIG. 24, identifiers of transport robots 10, the state of each robot (transporting, waiting), information on transport robots 10 to form pairs, the current position, information related to a route used by the transport robots 10, and a transport source and a transport destination of articles 60 are managed in association with each other.

As the identifier of each transport robot 10, arbitrary identifiers (IDs) such as Media Access Control (MAC) addresses or names (transport robots No. 1 and No. 2) assigned to each transport robot 10 can be used. Of the pieces of the information illustrated in FIG. 24, the state field is updated by the robot control section 505. The field related to pair robot is updated by the robot selection section 503. The current position field is updated by the field information management section 502. The transport route field, the transport source field, and the transport destination field are updated by the route calculation section 504.

The robot control section 505 is means for controlling transport robots 10. The robot control section 505 transmits control information for transporting articles 60 by transport robot pairs to each transport robot 10, based on position information of transport robots 10 and position information of other transport robots 10 making pairs with the transport robots 10. In other words, the robot control section 505 controls transport robots 10 by transmitting control commands (control information) to the transport robots 10. Note that, when the robot control section 505 transmits control commands to transport robots 10, the robot control section 505 may transmit all the control commands at once such that transport robot pairs can move from transport source to transport destination, or may transmit control commands in order according to the positions of the transport robot pairs and the like.

The robot control section 505 needs information related to the orientations of transport robots 10 when controlling the transport robots 10. In this case, gyroscope sensors or the like are attached to the transport robots 10, and the robot control section 505 may obtain information related to the orientations from the transport robots 10. Alternatively, the orientations when placing the transport robots 10 in the waiting area may be predetermined, and the orientations of the transport robots 10 may be estimated, based on control commands transmitted from the robot control section 505 to the transport robots 10.

When receiving the notification of robot selection from the robot selection section 503, the robot control section 505 controls the selected transport robots 10 to move to the transport source described in the robot management information. Note that the control related to the initial movement can be the same as the control when transport robots 10 move from transport source to transport destination, which will be described later, and thus the details thereof will be omitted.

When the transport robots 10 move to the transport source, the robot control section 505 confirms whether or not articles 60 are placed at the transport source. Any method can be used for the confirmation. For example, in a case where an operator places the articles 60 at the transport source, the confirmation may be made by the operator pressing a button connected to the control apparatus 50. Alternatively, sensors (infrared sensors, cameras, weight sensors, and the like) may be installed in the area which is the transport source, and the confirmation of articles 60 may be performed by using the sensors. In other words, the robot control section 505 may recognize that articles 60 has been installed at the transport source, based on the output of the sensors.

The robot control section 505 may confirm whether or not the articles 60 placed at the transport source are the articles 60 input by the article transport plan information. For example, consider a case in which a camera is installed near the transport source and a marker (AR marker or the like) for identifying an article 60 is attached to the article 60. In this case, the robot control section 505 may refer to information in which the marker and the article 60 are associated with each other, and confirm that the article 60 placed at the transport source match the article 60 input by the article transport plan information.

Alternatively, the robot control section 505 may determine that the articles 60 that the operator has placed at the transport source are the articles 60 described in the article transport plan information, and may omit the confirmation. In other words, the robot control section 505 may trust the operator and omit the confirmation of the articles 60.

When an article 60 is placed at a transport source, the robot control section 505 controls two transport robots 10 to sandwich the article 60 by transmitting control commands to the transport robots 10. Specifically, the robot control section 505 moves the two transport robots 10 so as to face each other over the article 60, and moves the robots such that the distance between the robots becomes narrower.

When each of the two transport robots 10 succeeds in sandwiching the article 60, the control apparatus 50 is notified of the article sandwiching completion notification. When the robot control section 505 receives the notification from each of the two transport robots 10, the robot control section 505 starts the transport by the two transport robots 10. Specifically, the robot control section 505 generates a control command such that the transport robot pair sandwiching the article 60 moves on the route calculated as the transport route of the transport robot pair, and transmit the control command to each transport robot 10.

The robot control section 505 treats one of the two transport robots 10 as a "leading transport robot" and treats the other one as a "following transport robot". Moreover, the robot control section 505 obtains the current position of the leading transport robot 10 of the transport robots 10 described in the robot management information. Next, the robot control section 505 determines the position where the leading transport robot 10 arrives.

In a case of causing the transport robot pair to go straight, the robot control section 505 calculates the time and speed for rotating the motor of each transport robot 10 according to the distance between the current position of the leading transport robot 10 and the calculated arrival position. At that time, the robot control section 505 generates a control command such that the motor rotation speeds of the transport robots 10 are the same.

In a case of rotating the transport robot pair, the robot control section 505 uses a model of circular motion that draws a curve by speed difference between left and right wheels. Specifically, the robot control section 505 calculates input speed to the left and right wheels for arriving at the target position from the current position in a circular orbit, based on the target position and the position and the orientation of the robot. The robot control section 505 uses the calculated input speed as is for the leading transport robot 10, and generates a control command to be transmitted to the leading transport robot 10, based on the calculated input speed. In contrast, for the following transport robot 10, the robot control section 505 calculates a speed correction value in the front-rear direction based on the distance between the robots (the distance between plates over which the transport robots sandwich the article 60) and an offset correction value of the left and right wheels based on a rotation angle. The robot control section 505 generates a control command to be transmitted to the following transport robot 10, based on these correction values (the speed correction value and the offset correction value).

In a case where the transport robot pair arrives at the transport destination, the robot control section 505 controls the transport robot pair so as to place the article 60 at the transport destination. Specifically, the robot control section 505 completes the transport of the article 60 by controlling the distance between the two transport robots 10 to be longer.

In a case where the article transport plan information obtained from the terminal 40 includes supplementary information and the content of the supplementary information is related to robot control, the robot control section 505 may control the transport robots 10 according to the supplementary information.

For example, when "normal" is specified as the mode of article transport, the robot control section 505 controls the transport robot pair to repeat the movement between the transport source and the transport destination. Specifically, when the transport robot pair finishes the transport of the article 60, the robot control section 505 moves the transport robot pair to the transport source and controls the transport robot pair to sandwich an article 60 again at the transport source. After that, the robot control section 505 controls the transport robot pair sandwiching the article 60 so as to move to the transport destination. In the case of normal operation, such control is repeated.

When "one-way" is specified as the mode of article transport, when the transport robot pair completes the transport of an article 60, the robot control section 505 moves the transport robot pair to a predetermined waiting area and prepares for a next article transport.

When "loop" is specified as the mode of article transport, the robot control section 505 controls the transport robot pair to transport the article 60 placed at the transport source to the transport destination. When the robot control section 505 finishes the transport of the article 60, the robot control section 505 controls the transport robot pair to transport an article 60 placed at the transport destination to the transport source. When the article transport to the transport source is finished, the robot control section 505 transports an article 60 placed at the transport source to the transport destination again. In the case of loop operation, such control is repeated.

Note that, in a case where article transport plan information includes optional information for interpretation related to a transport mode of articles 60, the robot control section 505 changes the control of the transport robot pair, based on the optional information. Specifically, in a case where optional information such as "transport mode=individual transport robot pair" is included in article transport plan information, the robot control section 505 performs control according to the normal, one-way, or loop described above.

In contrast, in a case where optional information such as "transport mode=entire system" is included in article transport plan information, the robot control section 505 controls the transport robots 10 included in the system, not limited to one set of transport robot pair, such that the specified operation of article transport is realized. For example, in a case where "loop" is specified, and one set of transport robot pair has reciprocated between a transport source and a transport destination for a predetermined number of times, the robot control section 505 selects a transport robot pair different from the transport robot pair, and controls the transport robot pair so as to reciprocate between the two points. Alternatively, the robot control section 505 may replace the transport robot pair that reciprocates between the transport source and the transport destination, based on the remaining energy levels of each transport robot 10.

Figure 25:
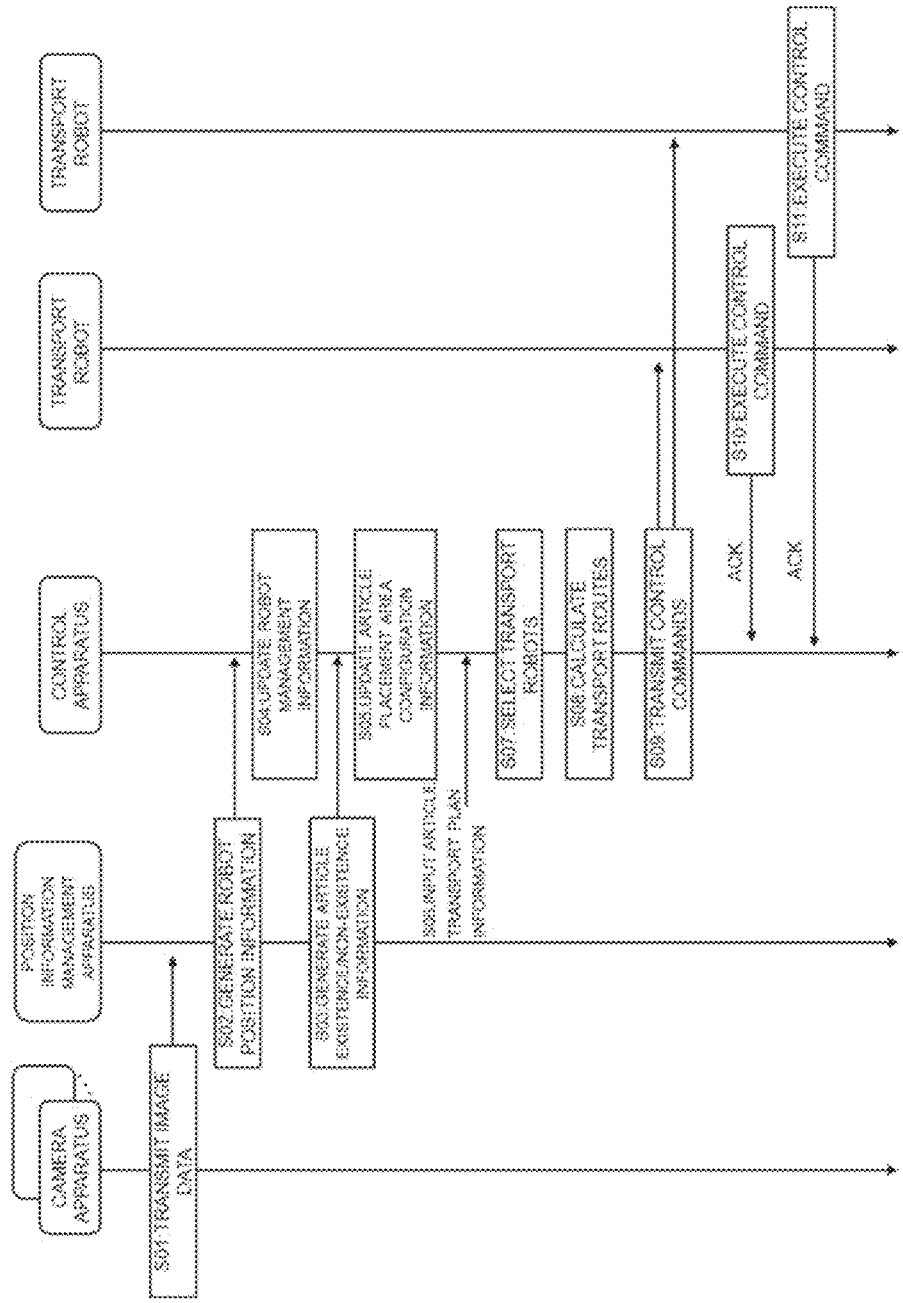
FIG. 25 is a sequence diagram illustrating an example of operation of the transport system according to the first example embodiment.

Subsequently, the operation of the transport system according to the first example embodiment will be described. FIG. 25 is a sequence diagram illustrating an example of the operation of the transport system according to the first example embodiment.

The camera apparatuses 20 transmit captured image data to the position information management apparatus 30 (step S01).

The position information management apparatus 30 analyzes the obtained image data and attempts to detect transport robots 10. In a case where transport robots 10 are detected from the field, the position information management apparatus 30 generates robot position information (step S02). The generated robot position information is transmitted to the control apparatus 50.

The position information management apparatus 30 analyzes the obtained image data and confirms the situations of article placement areas. The position information management apparatus 30 determines the presence/absence of articles 60 in small areas included in the article placement areas, and generates article existence/non-existence information, based on the results (step S03). The generated article existence/non-existence information is transmitted to the control apparatus 50.

The camera apparatuses 20 and the position information management apparatus 30 repeat the operations of steps S01 to S03 in a predetermined cycle. As a result, the control apparatus 50 can grasp the situations in the field in real time.

When the control apparatus 50 obtains the robot position information, the control apparatus 50 updates robot management information (step S04).

When the control apparatus 50 obtains the article existence/non-existence information, the control apparatus 50 updates article placement area configuration information (step S05).

The control apparatus 50 inputs article transport plan information from the terminal 40 (step S06).

The control apparatus 50 selects transport robots 10 to transport articles 60 (step S07).

The control apparatus 50 calculates a transport route of transport robot pairs, based on the article transport plan information, the article placement area configuration information, and the like (step S08).

The control apparatus 50 generates control commands and transmits the control commands to the transport robot pairs such that transport robot pairs move on the calculated transport route (step S09).

Each transport robot 10 receives the control command and executes the control command (steps S10 and S11). When the transport robot 10 executes the control command, the transport robot 10 transmits a positive acknowledgment (ACK, Acknowledgment).

The control apparatus 50 and the transport robot pairs transport the articles 60 to the transport destination by repeating the steps S09 to S11.

As above, in the transport system according to the first example embodiment, the terminal 40 provides GUIs when the terminal 40 inputs information related to the transport source and the transport destination of the articles 60. At that time, the terminal 40 makes it possible to specify transport destinations or the like of articles 60 as small areas included in article placement areas, or makes it possible to specify article placement areas themselves as transport destination or the like. Alternatively, in the first example embodiment, transport destinations can be specified by the relative positional relationships such as the upper side or the right side in an article placement area. As a result, the operator does not need to input the coordinates of transport destination of articles 60, but can specify the transport destination of the articles 60 by intuitive operation. In other words, according to the first example embodiment, a transport system that facilitates input of information related to movements of articles 60 is provided.

In addition, in the first example embodiment, two transport robots cooperate to transport articles 60, so the labor of operators reloading the articles 60 is unnecessary, or it is possible to handle a wide variety of shapes of articles 60. In other words, because two transport robots 10 make a pair and move while sandwiching an article 60, movements of articles 60 can be performed regardless of the shapes or the like of the articles 60. Even in a case where articles 60 are loaded on carts, pairs of transport robots 10 can move the articles 60 together with the carts, so that the operators do not need to reload the articles 60. Because two transport robots cooperate to transport (carry) an article 60, it is not necessary to attach towing equipment or the like to the article 60 or the cart.

The control apparatus 50 can be implemented as a cloud server on a network (for example, the Internet or a wireless communication network such as LTE), and realizes coordinated control of transport robots 10 while overlooking the entire field. In addition, because the transport robots 10 are centrally controlled by the control apparatus 50, sensors (expensive sensors) for monitoring the peripheries of the transport robots 10 are unnecessary, and the prices of the transport robots 10 can be reduced.

Figure 26:
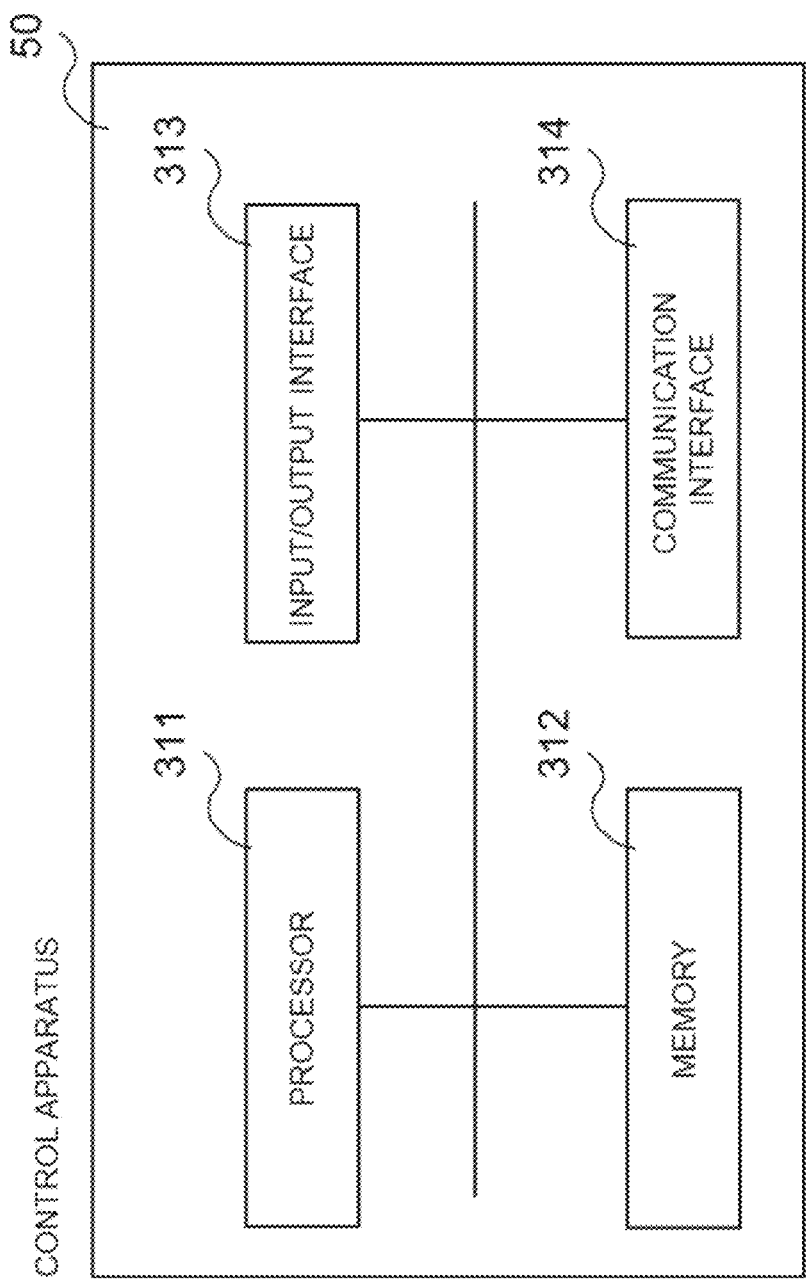
FIG. 26 is a diagram illustrating an example of a hardware configuration of the control apparatus.

Subsequently, hardware of each apparatus constituting the transport system will be described. FIG. 26 is a diagram illustrating an example of a hardware configuration of the control apparatus 50.

The control apparatus 50 can be configured with an information processing apparatus (so-called, a computer), and includes a configuration illustrated in FIG. 26. For example, the control apparatus 50 includes a processor 311, a memory 312, an input/output interface 313, a communication interface 314, and the like. Constituent elements such as the processor 311 are connected to each other with an internal bus or the like, and are configured to be capable of communicating with each other.

However, the configuration illustrated in FIG. 26 is not to limit the hardware configuration of the control apparatus 50. The control apparatus 50 may include hardware not illustrated, or need not include the input/output interface 313 as necessary. The number of processors 311 and the like included in the control apparatus 50 is not to be limited to the example illustrated in FIG. 26, and for example, a plurality of processors 311 may be included in the control apparatus 50.

The processor 311 is, for example, a programmable device such as a central processing unit (CPU), a micro processing unit (MPU), and a digital signal processor (DSP). Alternatively, the processor 311 may be a device such as a field programmable gate array (FPGA) and an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard, a touch panel, and a mouse.

The communication interface 314 is a circuit, a module, or the like that performs communication with another apparatus. For example, the communication interface 314 includes a network interface card (MC), a radio communication circuit, or the like.

The function of the control apparatus 50 is implemented by various processing modules. Each of the processing modules is, for example, implemented by the processor 311 executing a program stored in the memory 312. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that the position information management apparatus 30, the terminal 40, and the like can also be configured by information processing apparatuses similarly to the control apparatus 50, and because the basic hardware configurations are not different from that of the control apparatus 50, the descriptions thereof will be omitted.

[Example Alterations]

Note that the configuration, the operation, and the like of the transport system described in the example embodiment are merely examples, and are not to limit the configuration and the like of the system.

For example, in the first example embodiment, a case in which a transport robot pair by two transport robots 10 transports articles 60 has been described, but the number of transport robots used may be one. In other words, articles 60 may be transported by using conventional transport robots (for example, a type of robot that loads an article 60 on the robot itself, or a type of robot that is integrated with an article 60 by towing equipment). In this case, the control apparatus 50 may control one transport robot, based on article transport plan information or the like obtained from the terminal 40, so that the articles 60 can be transported by simpler control. Alternatively, the number of transport robots 10 to be controlled by the control apparatus 50 may be three or more. By increasing the number of transport robots 10, heavier articles 60 and the like can be transported by using smaller (cheaper) transport robots 10.

In the example embodiment, the position information management apparatus 30 and the control apparatus 50 have been described as different apparatuses. However, the functions of the position information management apparatus 30 may be realized by the control apparatus 50. Alternatively, the position information management apparatus 30 may be installed inside the field, and the control apparatus 50 may be implemented in a server on the network. In other words, the transport system disclosed in the present application may be realized as an edge cloud system.

In the example embodiment, a case in which cameras capable of detecting heights of object bodies (for example, depth cameras) are used has been described. However, in a case where it is not necessary to detect heights of object bodies, normal cameras may be used. Alternatively, infrared sensors or distance sensors may be used in combination with normal cameras as sensors for detecting positions of object bodies.

In a case where a QR code (registered trademark) can be attached to an article 60, the code may include identification information of the article 60, and transport robots 10 may read the information. In this case, the transport robots 10 may compare read identification information with identification information of article 60 instructed to be transported by the control apparatus 50, and determine whether or not to transport the article 60 according to the comparison results.

By installing a transport program in a storage section of a computer, the computer can be caused to function as a control apparatus. By causing the computer to execute the transport program, a transport method can be executed by the computer.

In the sequence diagram used in the description above, a plurality of processes (processing) are described in order; however, the order of execution of the processes executed in each example embodiment is not limited to the described order. In each example embodiment, the illustrated order of processes can be changed as far as there is no problem with regard to processing contents, such as a change in which respective processes are executed in parallel, for example.

Although the industrial applicability of the present invention is apparent from the description, the present invention can be preferably applied to article transport in factories, distribution warehouses, and the like.

Part of or all the example embodiments may be described as in the following supplementary notes but are not limited to the following.

Supplementary Note 1

A transport system comprising:
a transport robot (10, 101) configured to transport an article;
a control apparatus (50, 102) configured to control the transport robot (10, 101); and
a terminal (40, 103) configured to input information related to transport of the article, wherein
the control apparatus (50, 102) is configured to:
identify a transport destination of the article, based on the information related to the transport obtained from the terminal (40, 103); and
perform control of the transport robot (10, 101) to transport the article to the identified transport destination.

Supplementary Note 2

The transport system according to supplementary note 1, wherein
the terminal (40, 103) is configured to transmit first position information and second position information to the control apparatus (50, 102), and
the control apparatus (50, 102) is configured to control the transport robot (10, 101) such that the article existing in a place corresponding to the first position information is transported to a place corresponding to the second position information.

Supplementary Note 3

The transport system according to supplementary note 1 or 2, wherein
the control apparatus (50, 102) is configured to:
calculate a transport route which is a route for transporting the article to the identified transport destination; and
control the transport robot (10, 101), based on the transport route calculated.

Supplementary Note 4

The transport system according to any one of supplementary notes 1 to 3, wherein
the control apparatus (50, 102) is configured to calculate a degree of congestion at the transport destination of the article, and determine the transport destination of the article according to the degree of congestion calculated.

Supplementary Note 5

The transport system according to any one of supplementary notes 1 to 4, wherein
the terminal (40, 103) comprises a storage section configured to manage a name of the transport destination of the article and position information in association with each other, and the terminal (40, 103) is configured to identify the position information of the transport destination, based on the name input of the transport destination, and transmit the position information identified to the control apparatus (50, 102).

Supplementary Note 6

The transport system according to supplementary note 2, wherein the control apparatus (50, 102) is configured to control, in a case where the article is not successfully transported to the place corresponding to the second position information, the transport robot (10, 101) such that the article is transported to a place different from the place corresponding to the second position information.

Supplementary Note 7

The transport system according to any one of supplementary notes 1 to 6, wherein
the transport system comprises a plurality of the transport robots (10, 101), and
the control apparatus (50, 102) is configured to control the plurality of the transport robots (10, 101) such that the plurality of the transport robots (10, 101) cooperate to transport the article.

Supplementary Note 8

The transport system according to any one of supplementary notes 1 to 7, wherein
the information related to the transport includes a state of the transport destination.

Supplementary Note 9

A control apparatus (50, 102) connected to a transport robot (10, 101) configured to transport an article and a terminal (40, 103) configured to input information related to transport of the article, wherein
the control apparatus (50, 102) is configured to: identify a transport destination of the article, based on the information related to the transport obtained from the terminal (40, 103); and perform control of the transport robot (10, 101) to transport the article to the identified transport destination.

Supplementary Note 10

The control apparatus (50, 102) according to supplementary note 9, wherein the terminal (40, 103) is configured to transmit first position information and second position information to the control apparatus (50, 102), and the control apparatus (50, 102) is configured to control the transport robot (10, 101) such that the article existing in a place corresponding to the first position information is transported to a place corresponding to the second position information.

Supplementary Note 11

The control apparatus (50, 102) according to supplementary note 9 or 10, wherein the control apparatus (50, 102) is configured to:
calculate a transport route which is a route for transporting the article to the identified transport destination; and
control the transport robot (10, 101), based on the transport route calculated.

Supplementary Note 12

The control apparatus (50, 102) according to any one of supplementary notes 9 to 11, wherein the control apparatus (50, 102) is configured to calculate a degree of congestion at the transport destination of the article, and determine the transport destination of the article according to the degree of congestion calculated.

Supplementary Note 13

The control apparatus (50, 102) according to any one of supplementary notes 9 to 12, wherein the terminal (40, 103) comprises a storage section configured to manage a name of the transport destination of the article and position information in association with each other, and is configured to identify the position information of the transport destination, based on the name input of the transport destination, and transmit the position information identified to the control apparatus (50, 102), and the control apparatus (50, 102) is configured to receive the position information identified from the terminal (40, 103).

Supplementary Note 14

The control apparatus (50, 102) according to supplementary note 10, wherein the control apparatus is configured to control, in a case where the article is not successfully transported to the place corresponding to the second position information, the transport robot (10, 101) such that the article is transported to a place different from the place corresponding to the second position information.

Supplementary Note 15

The control apparatus (50, 102) according to any one of supplementary notes 9 to 14, wherein a plurality of the transport robots (10, 101) are included, and the control apparatus (50, 102) is configured to control the plurality of the transport robots (10, 101) such that the plurality of the transport robots (10, 101) cooperate to transport the article.

Supplementary Note 16

The control apparatus (50, 102) according to any one of supplementary notes 9 to 15, wherein the information related to the transport includes a state of the transport destination.

Supplementary Note 17

A transport method performed in a transport system provided with a transport robot (10, 101) configured to transport an article, a control apparatus (50, 102) configured to control the transport robot (10, 101), and a terminal (40, 103) configured to input information related to transport of the article, the transport method comprising:

identifying a transport destination of the article, based on the information related to the transport obtained from the terminal (40, 103); and performing control of the transport robot (10, 101) to transport the article to the identified transport destination.

Supplementary Note 18

The transport method according to supplementary note 17, further comprising transmitting first position information and second position information to the control apparatus (50, 102), wherein the performing control controls the transport robot (10, 101) such that the article existing in a place corresponding to the first position information is transported to a place corresponding to the second position information.

Supplementary Note 19

The transport method according to supplementary note 17 or 18, further comprising calculating a transport route which is a route for transporting the article to the identified transport destination, wherein the performing control controls the transport robot (10, 101), based on the transport route calculated.

Supplementary Note 20

The transport method according to any one of supplementary notes 17 to 19, further comprising calculating a degree of congestion at the transport destination of the article, and determining the transport destination of the article according to the degree of congestion calculated.

Supplementary Note 21

The transport method according to any one of supplementary notes 17 to 20, wherein the terminal (40, 103) comprises a storage section configured to manage a name of the transport destination of the article and position information in association with each other, and the transport method further comprises:

identifying the position information of the transport destination, based on the name input of the transport destination; and transmitting the position information identified to the control apparatus (50, 102).

Supplementary Note 22

The transport method according to supplementary note 18, wherein
in the performing control, in a case where the article is not successfully transported to the place corresponding to the second position information, the transport robot (10, 101) is controlled such that the article is transported to a place different from the place corresponding to the second position information.

Supplementary Note 23

The transport method according to any one of supplementary notes 17 to 22, wherein
a plurality of the transport robots (10, 101) are included, and
the performing control controls the plurality of the transport robots (10, 101) such that the plurality of the transport robots (10, 101) cooperate to transport the article.

Supplementary Note 24

The transport method according to any one of supplementary notes 17 to 23, wherein
the information related to the transport includes a state of the transport destination.

Supplementary Note 25

A program for causing a computer (311) mounted on a control apparatus (50, 102) connected to a transport robot (10, 101) configured to transport an article and a terminal (40, 103) configured to input information related to transport of the article to perform:
identifying a transport destination of the article, based on the information related to the transport obtained from the terminal (40, 103); and
performing control of the transport robot (10, 101) to transport the article to the identified transport destination.

Note that the disclosures of the cited literature in the citation list are intended to be incorporated herein by reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

This application claims priority based on JP 2019-153965 filed on Aug. 26, 2019, the entire disclosure of which is incorporated herein.

REFERENCE SIGNS LIST 10, 10-1 to 10-4, 101 Transport Robot
20, 20-1 to 20-3 Camera Apparatus
30 Position Information Management Apparatus
40, 103 Terminal
50, 102 Control Apparatus
60, 60-1, 60-2 Article
201, 301, 401, 501 Communication Control Section
202 Actuator Control Section
203 Sandwiching Detection Section
302 Robot Position Information Generation Section
303 Article Existence/Non-Existence Information Generation Section
304, 404, 506 Storage Section
311 Processor
312 Memory
313 Input/Output Interface
314 Communication Interface
402 Transport Plan Information Generation Section
403 Display Section
502 Field Information Management Section
503 Robot Selection Section
504 Route Calculation Section
505 Robot Control Section

What is claimed is:

1. A transport system comprising:
a transport robot configured to transport an article;
a control apparatus configured to control the transport robot; and
a terminal configured to receive an identity of the article to be transported and transmit to the control apparatus, first position information for a position that the article is located and second position information for a position that the article is to be transported, wherein
the control apparatus is comprising:
a memory storing instructions; and
one or more processors configured to execute the instructions to:
identify a transport destination of the article, based on the information related to the transport obtained from the terminal;
perform control of the transport robot to transport the article to the identified transport destination; such that the article existing in a place corresponding to the first position information is transported to a place corresponding to the second position information; and
control, in a case where the article is already placed in the place corresponding to the second position information, the transport robot such that the article is transported to a place different from the place corresponding to the second position information.

2. The transport system according to claim 1, wherein
the one or more processors are configured to execute the instructions to:
calculate a transport route which is a route for transporting the article to the identified transport destination; and
control the transport robot, based on the transport route calculated.

3. The transport system according to claim 1, wherein
the one or more processors are configured to execute the instructions to calculate a degree of congestion at the transport destination of the article, and determine the transport destination of the article according to the degree of congestion calculated.

4. The transport system according to claim 1, wherein
the terminal comprises a storage section configured to manage the transport destination of the article and position information for a position of transport destination in association with each other, and the terminal is configured to identify the position information, based on the transport destination, and transmit the position information identified to the control apparatus.

5. The transport system according to claim 1, wherein
the transport system comprises a plurality of the transport robots, and
the one or more processors are configured to execute the instructions to control the plurality of the transport robots such that the plurality of the transport robots cooperate to transport the article.

6. A control apparatus connected to a transport robot configured to transport an article and a terminal configured to receive an identity of the article to be transported and transmit to the control apparatus, first position information for a position that the article is located and second position information for a position that the article is to be transported, wherein
the control apparatus comprising:
a memory storing instructions; and
one or more processors configured to execute the instructions to:
identify a transport destination of the article, based on the information related to the transport obtained from the terminal;
perform control of the transport robot to transport the article to the identified transport destination such that the article existing in a place corresponding to the first position information is transported to a place corresponding to the second position information; and
control, in a case where the article is already placed in the place corresponding to the second position information, the transport robot such that the article is transported to a place different from the place corresponding to the second position information.

7. The control apparatus according to claim 6, wherein
the terminal is configured to transmit to the control apparatus, first position information for a position that the article is located and second position information for a position that the article is to be transported, and
the one or more processors are configured to execute the instructions to control the transport robot such that the article existing in a place corresponding to the first position information is transported to a place corresponding to the second position information.

8. The control apparatus according to claim 6 wherein
the one or more processors are configured to execute the instructions to:
calculate a transport route which is a route for transporting the article to the identified transport destination; and
control the transport robot, based on the transport route calculated.

9. The control apparatus according to claim 6, wherein
the terminal comprises a storage section configured to manage the transport destination of the article and position information in association with each other, and is configured to identify the position information of the transport destination, based on the transport destination, and transmit the position information identified to the control apparatus, and
the one or more processors are configured to execute the instructions to receive the position information identified from the terminal.

10. The control apparatus according to claim 6, wherein
a plurality of the transport robots are included, and
the one or more processors are configured to execute the instructions to control the plurality of the transport robots such that the plurality of the transport robots cooperate to transport the article.

11. A transport method performed in a transport system provided with
a transport robot configured to transport a first article,
a control apparatus configured to control the transport robot, and
a terminal configured to receive an identity of the first article to be transported and transmit to the control apparatus, first position information for a position that the first article is located and second position information for a position that the first article is to be transported, the transport method comprising:
identifying a transport destination of the first article, based on the information related to the transport obtained from the terminal;
performing control of the transport robot to transport the first article to the identified transport destination such that the first article existing in a place corresponding to the first position information is transported to a place corresponding to the second position information; and
controlling, in a case where a second article is already placed in the place corresponding to the second position information, the transport robot such that the first article is transported to a place different from the place corresponding to the second position information.

12. The transport method according to claim 11, further comprising
transmitting to the control apparatus, first position information for a position that the first article is located and second position information for a position that the first article is to be transported, wherein
the performing control controls the transport robot such that the first article existing in a place corresponding to the first position information is transported to a place corresponding to the second position information.

13. The transport method according to claim 12, wherein
in the performing control, in a case where the first article is already placed in the place corresponding to the second position information, the transport robot is controlled such that the first article is transported to a place different from the place corresponding to the second position information.

14. The transport method according to claim 11, further comprising
calculating a transport route which is a route for transporting the first article to the identified transport destination, wherein
the performing control controls the transport robot, based on the transport route calculated.

15. The transport method according to claim 11, further comprising
calculating a degree of congestion at the transport destination of the first article, and determining the transport destination of the first article according to the degree of congestion calculated.

16. The transport method according to claim 11, wherein
the terminal comprises a storage section configured to manage the transport destination of the first article and position information in association with each other, and
the transport method further comprises:
identifying the position information of the transport destination, based on the transport destination; and
transmitting the position information identified to the control apparatus.

17. The transport method according to claim 11, wherein
a plurality of the transport robots are included, and
the performing control controls the plurality of the transport robots such that the plurality of the transport robots cooperate to transport the first article.

18. The transport method according to claim 11, wherein
the information related to the transport includes a state of the transport destination.

* * * * *